United States Patent
Bhattad et al.

(10) Patent No.: US 8,681,651 B2
(45) Date of Patent: Mar. 25, 2014

(54) REFERENCE SIGNAL RECEPTION AND CHANNEL STATE INFORMATION DETERMINATION FOR MULTIPLE NODES IN A WIRELESS COMMUNICATION NETWORK

(75) Inventors: Kapil Bhattad, San Diego, CA (US); Wanshi Chen, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 13/288,172

(22) Filed: Nov. 3, 2011

(65) Prior Publication Data

US 2012/0113816 A1    May 10, 2012

Related U.S. Application Data

(60) Provisional application No. 61/410,780, filed on Nov. 5, 2010.

(51) Int. Cl.
*G01R 31/08*    (2006.01)

(52) U.S. Cl.
USPC ............ 370/252; 370/246; 370/328; 370/330

(58) Field of Classification Search
None
See application file for complete search history.

(56) References Cited

U.S. PATENT DOCUMENTS

| | | | |
|---|---|---|---|
| 2011/0038285 A1 | 2/2011 | Kwon et al. | |
| 2011/0038302 A1 | 2/2011 | Papasakellariou et al. | |
| 2011/0149894 A1 | 6/2011 | Luo et al. | |
| 2011/0188481 A1 | 8/2011 | Damnjanovic et al. | |
| 2012/0147794 A1* | 6/2012 | Chung et al. | 370/280 |
| 2012/0155414 A1* | 6/2012 | Noh et al. | 370/329 |
| 2012/0220327 A1* | 8/2012 | Lee et al. | 455/509 |
| 2013/0128813 A1* | 5/2013 | Yang et al. | 370/328 |

FOREIGN PATENT DOCUMENTS

| | | |
|---|---|---|
| EP | 2076086 A2 | 7/2009 |
| EP | 2341751 A1 | 7/2011 |
| EP | 2408131 A1 | 1/2012 |
| WO | WO2009078651 A2 | 6/2009 |
| WO | WO2010054593 A1 | 5/2010 |
| WO | WO2010103886 A1 | 9/2010 |
| WO | WO2010124241 A2 | 10/2010 |

OTHER PUBLICATIONS

International Search Report and Written Opinion—PCT/US2011/059396—ISAEPO—May 4, 2012.

(Continued)

*Primary Examiner* — Duc C Ho
(74) *Attorney, Agent, or Firm* — Arent Fox LLP

(57) ABSTRACT

Techniques for receiving reference signals from multiple nodes and determining channel state information (CSI) for the nodes are disclosed. A user equipment (UE) may determine and report CSI for the multiple nodes to support data transmission to the UE. The nodes may transmit reference signals based on different configurations. The configuration for each node may indicate when, where, and how the node transmits its reference signal. The UE may determine CSI for different nodes and/or different combinations of nodes based on the reference signals transmitted by these nodes as well as an indication of which subframes to use to determine each CSI reported by the UE. The UE may report different CSIs for different subframes and may receive data transmission sent by a single node or a combination of nodes based on the reported CSIs.

41 Claims, 13 Drawing Sheets

(56) References Cited

OTHER PUBLICATIONS

Partial International Search Report—PCT/US2011/059396—ISA/EPO—Jun. 28, 2012.

ZTE 3GPP TSG RAN WG1 Meeting # 59 bis, R1-100537, Valencia, Spain, Jan. 18-22, 2010, pp. 1-4.

Qualcomm Incorporated, 3GPP TSG-RAN WG1 #60bis, R1-102331, Beijing, China, Apr. 12-16, 2010, pp. 1-7.

* cited by examiner

REFERENCE SIGNAL RECEPTION AND CHANNEL STATE INFORMATION DETERMINATION FOR MULTIPLE NODES IN A WIRELESS COMMUNICATION NETWORK

The present application claims priority to provisional U.S. Application Ser. No. 61/410,780, entitled "TRANSMISSION OF REFERENCE SIGNALS AND DATA TO SUPPORT COMMUNICATION BY RELAYS," filed Nov. 5, 2010, and incorporated herein by reference in its entirety.

BACKGROUND

I. Field

The present disclosure relates generally to communication, and more specifically to techniques for supporting wireless communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless network may include a number of base stations that can support communication for a number of user equipments (UEs). The wireless network may also include relays that can improve the coverage and capacity of the wireless network without the need for a potentially expensive wired backhaul link. A UE may communicate with one or more base stations and/or one or more relays at any given moment. The base stations and/or relays may transmit reference signals and data in a manner to provide good performance for the UE.

SUMMARY

Techniques for receiving reference signals from multiple nodes and determining channel state information (CSI) for the nodes are disclosed herein. A node may be a base station, a relay, or some other transmitting entity. In one scenario, the multiple nodes may correspond to a base station and a relay transmitting data to a UE. In another scenario, the multiple nodes may correspond to multiple cells supporting coordinated multi-point (CoMP) transmission to the UE. The multiple nodes may transmit reference signals based on different configurations. The reference signals may be CSI reference signals (CSI-RS), etc. The configuration for each node may indicate when, where, and/or how the node transmits its reference signal. The UE may determine CSIs for different nodes and/or different combinations of nodes based on the reference signals received from these nodes as well as an indication of which subframes to use to determine each CSI reported by the UE.

In one design, a UE may receive a first reference signal from a first node in first subframes and possibly third subframes. The UE may also receive a second reference signal from a second node in the first subframes and second subframes. The first reference signal may coincide with the second reference signal in the first subframes but not in the second or third subframes. The two reference signals may "coincide" when they are transmitted in the same subframe, e.g., on the same time-frequency resources or possibly different time-frequency resources.

The UE may receive an indication to determine CSI separately for the first subframes, the second subframes, and the third subframes. The UE may or may not be aware of which node or nodes transmit their reference signals in each subframe. In one design, the UE may determine first CSI for the first subframes based on the first and second reference signals received from the first and second nodes in the first subframes by the UE. The UE may determine second CSI for the second subframes based on only the second reference signal received from the second node in the second subframes by the UE. The UE may determine third CSI for the third subframes based on only the first reference signal received from the first node in the third subframes by the UE. The UE may report the first CSI, the second CSI, and the third CSI. The UE may thereafter receive data transmission sent by only the first node, or only the second node, or both the first and second nodes based on the first CSI, the second CSI, and/or the third CSI. The techniques described herein may be extended to more than two nodes.

Various aspects and features of the disclosure are described in further detail below.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11

(Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Figure 1:
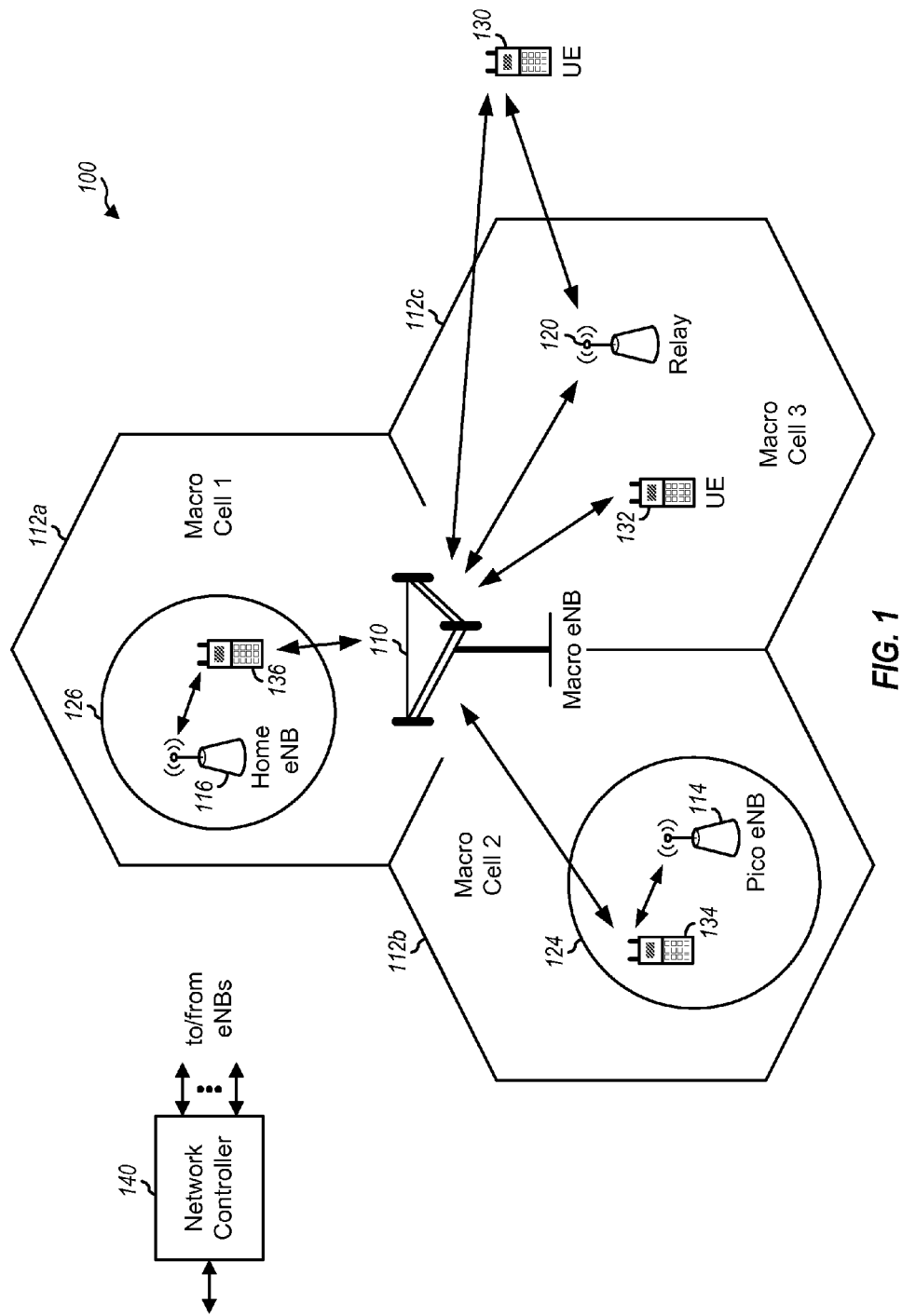
FIG. 1 shows a wireless communication network.

FIG. 1 shows a wireless communication network 100, which may be an LTE network or some other wireless network. Wireless network 100 may include a number of evolved Node Bs (eNBs) and other network entities. An eNB may be an entity that can communicate with UEs and relays and may also be referred to as a Node B, a base station, an access point, etc. An eNB may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. An eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, wireless network 100 includes a macro eNB 110 for three macro cells 112a (Macro Cell 1), 112b (Macro Cell 2) and 112c (Macro Cell 3), a pico eNB 114 for a pico cell 124, and a home eNB (HeNB) 116 for a femto cell 126. A network controller 140 may couple to a set of eNBs and may provide coordination and control for these eNBs.

A relay may be an entity that receives a transmission of data and/or other information from an upstream station (e.g., an eNB or a UE) and sends a transmission of the data and/or other information to a downstream station (e.g., a UE or an eNB). A relay may also be referred to as a relay station, a relay eNB, etc. A relay may also be a UE that relays transmissions for other UEs. In FIG. 1, a relay 120 may communicate with eNB 110 and UE 130 in order to facilitate communication between eNB 110 and UE 130.

UEs 130 to 136 may be dispersed throughout the wireless network, and each UE may be stationary or mobile. A UE may also be referred to as a mobile station, a terminal, an access terminal, a subscriber unit, a station, etc. A UE may be a cellular phone, a smart phone, a tablet, a wireless communication device, a personal digital assistant (PDA), a wireless modem, a handheld device, a laptop computer, a cordless phone, a wireless local loop (WLL) station, a netbook, a smartbook, etc. A UE may be able to communicate with eNBs, relays, other UEs, etc.

Figure 2:
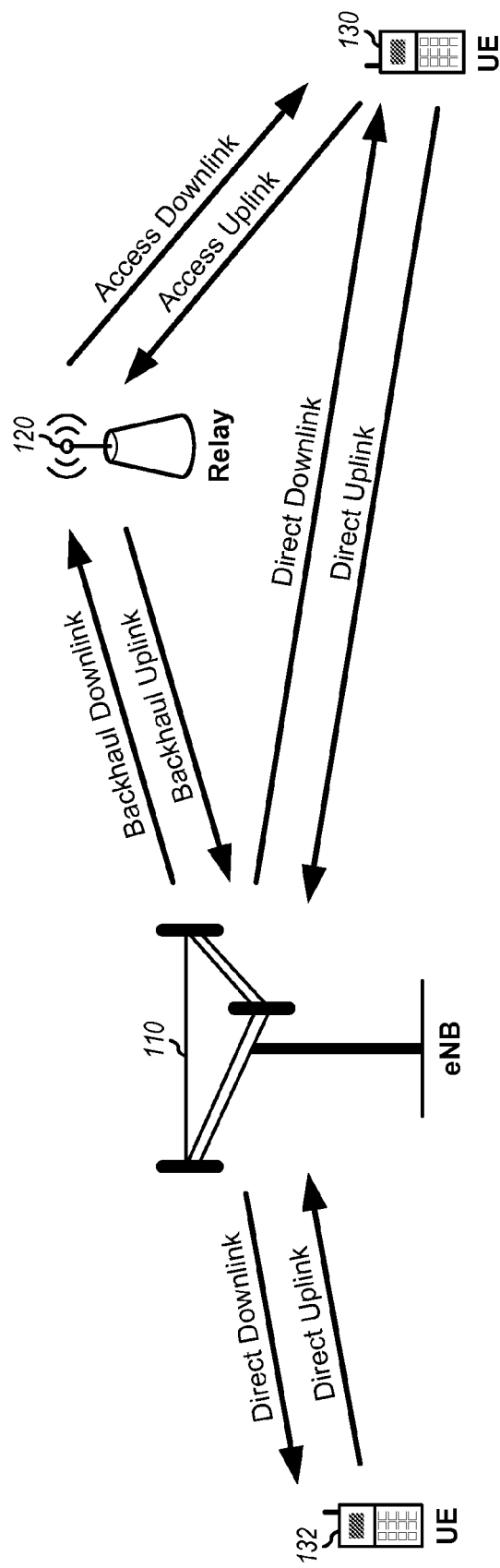
FIG. 2 shows communication between a base station and a UE via a relay.

FIG. 2 shows communication between eNB 110 and UE 130 via relay 120. Relay 120 may communicate with eNB 110 via a backhaul link and may communicate with UE 130 via an access link. On the backhaul link, relay 120 may receive downlink transmissions from eNB 110 via a backhaul downlink and may send uplink transmissions to eNB 110 via a backhaul uplink. On the access link, relay 120 may send downlink transmissions to UE 130 via an access downlink and may receive uplink transmissions from UE 130 via an access uplink. eNB 110 may be referred to as a donor eNB for relay 120. eNB 110 may identify UEs (e.g., UE 130) that can be potentially assisted by relays (e.g., relay 120). FIG. 2 also shows direct communication between eNB 110 and UEs 130 and 132. For example, eNB 110 may send downlink transmissions to UE 132 via a direct downlink and may receive uplink transmissions from UE 132 via a direct uplink.

Relay 120 may be a transparent relay or a non-transparent relay. A non-transparent relay (or Type-1 relay) may appear like an eNB to a UE, which may be aware of the presence of the relay. A transparent relay (or Type-2 relay) may be transparent to a UE, which may be unaware of the presence of the relay.

Relay 120 may operate in-band or out-of-band with respect to its usage of frequency spectrum. For in-band operation, the backhaul link and the access link share the same spectrum. For out-of-band operation, the backhaul link and the access link occupy different spectrum. Relay 120 may also operate in a half-duplex mode or a full-duplex mode. In the half-duplex mode, relay 120 can either transmit or receive (but not both) on a given spectrum in a given subframe. In the full-duplex mode, relay 120 can both transmit and receive in the same subframe.

Wireless network 100 may support CoMP transmission, which may also be referred to as downlink network multiple-input multiple-output (MIMO). For CoMP transmission, multiple cells may coordinate to transmit data to one or more UEs on the same time-frequency resource such that the signals from the multiple cells can be combined at a target UE and/or inter-cell interference can be reduced at an interfered UE. Joint processing or coordinated beamforming may be used for CoMP transmission. For joint processing, multiple cells may transmit data to one or more UEs with precoding vectors at different cells being selected to achieve beamforming gain at a target UE and/or interference reduction at one or more interfered UEs served by one or more neighbor cells. For coordinated beamforming, a single cell may transmit data to a target UE with one or more precoding vectors selected for the cell by trading between beamforming gain to the target UE and interference reduction to one or more interfered UEs. For both joint processing and coordinated beamforming, the precoding vector(s) used by one or more cells to transmit data to the target UE may be selected by considering the channels of the target UE as well as the channels of other UE(s) in order to reduce inter-cell interference.

Figure 3:
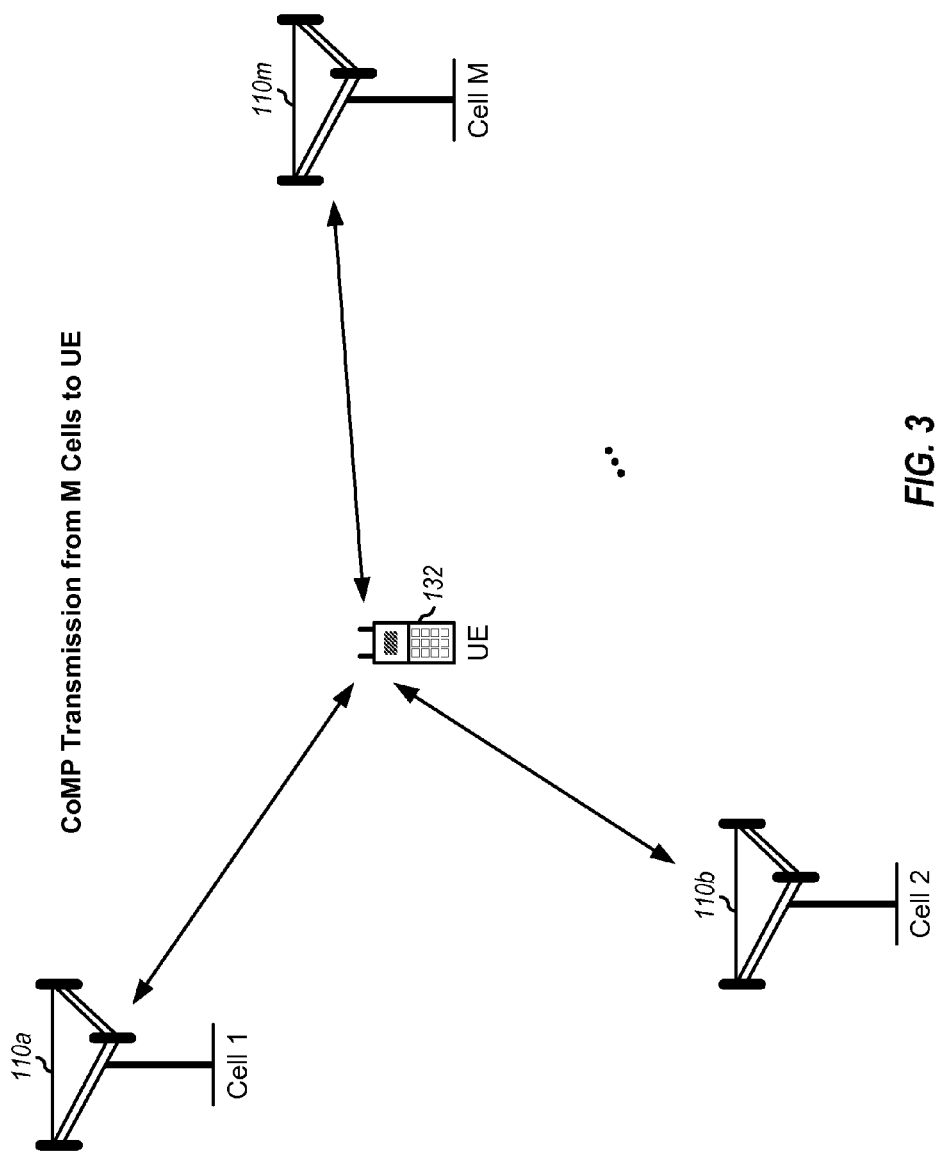
FIG. 3 shows CoMP transmission from multiple cells to a single UE.

FIG. 3 shows an example of CoMP transmission from multiple cells 110a (Cell 1) to 110m (Cell M) to a single UE 132. The UE may have a CoMP measurement set, which may include all cells that can be measured by the UE and can participate in CoMP transmission to the UE. These cells may belong to the same eNB or different eNBs and may be selected based on channel gain, pathloss, received signal strength, received signal quality, etc. For example, the CoMP measurement set may include cells with channel gain or received signal quality above a threshold. The UE may determine and report CSI for the cells in the CoMP measurement set. The UE may be served by one or more cells in the CoMP measurement set with joint processing or coordinated beamforming. The one or more cells serving the UE may include all or a subset of the cells in the CoMP measurement set and may be dynamically selected without the UE's knowledge.

In general, a UE may be served by one or more nodes at any given moment. A node may be an eNB, a relay, a cell, etc. The node(s) serving the UE may be static or may dynamically change over time, with or without the UE's knowledge.

A UE may determine and report CSI for a set of nodes to support data transmission by the nodes to the UE. The nodes may transmit reference signals based on different configurations, which may or may not be known to the UE. The UE may determine different CSIs for different nodes and/or different combinations of nodes based on the reference signals received from these nodes as well as an indication of which subframes to use to determine each CSI, as described below.

The techniques for receiving reference signals and determining CSI may be used for FDD systems and TDD systems. In a FDD system, the downlink and uplink are allocated separate frequency channels. Downlink transmissions and uplink transmissions may be sent concurrently on the two frequency channels. In a TDD system, the downlink and uplink share the same frequency channel. Downlink and uplink transmissions may be sent on the same frequency channel in different time intervals. For clarity, certain aspects of the techniques are described below for a FDD system.

Figure 4:
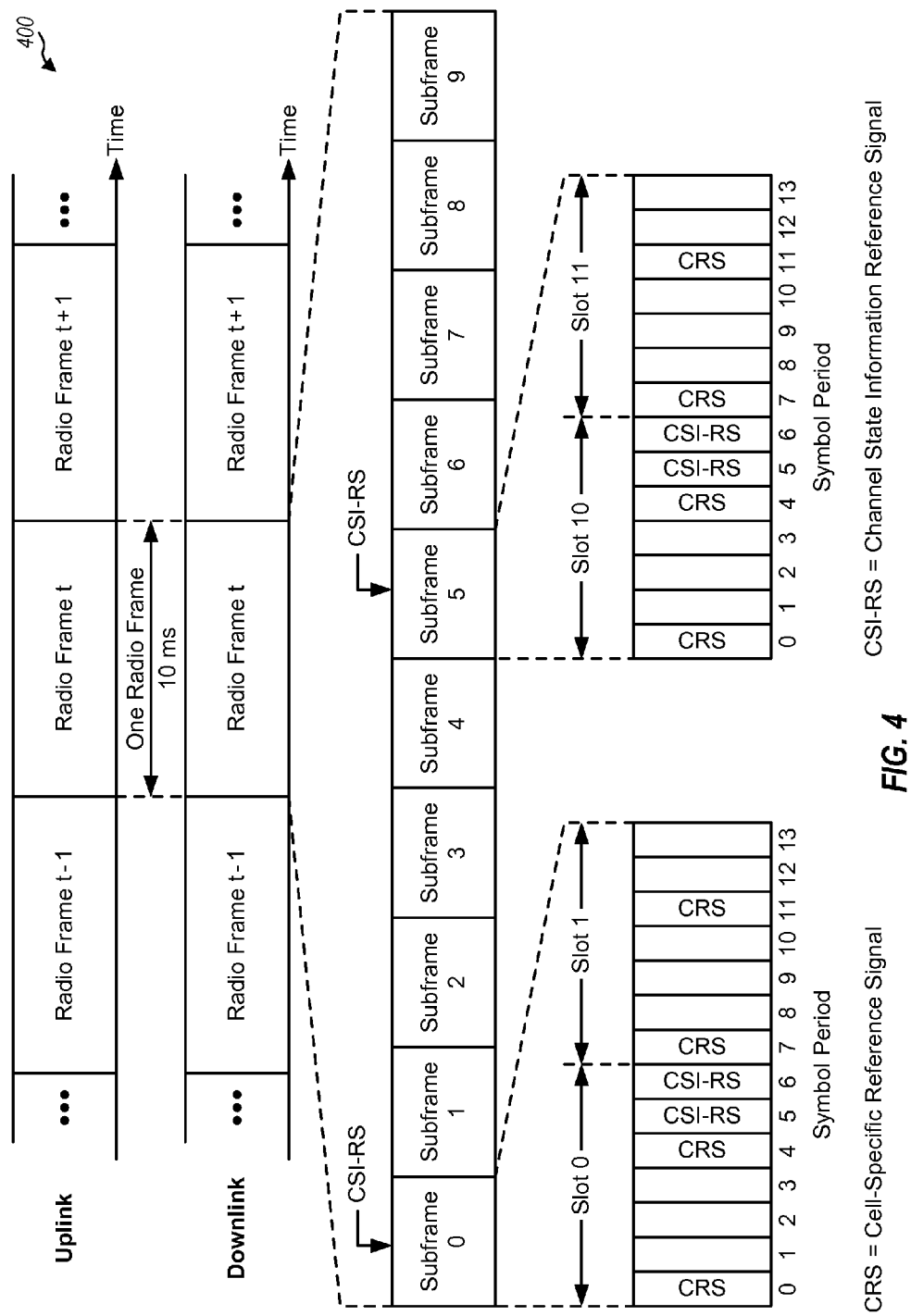
FIG. 4 shows a frame structure for frequency division duplexing (FDD).

FIG. 4 shows a frame structure 400 used for FDD in LTE. The transmission timeline for each of the downlink and uplink is partitioned into units of radio frames. Each radio frame has a duration of 10 milliseconds (ms) and is partitioned into 10 subframes with indices of 0 through 9. Each subframe includes two slots. Each radio frame thus includes 20 slots with indices of 0 through 19. Each slot includes L symbol periods, e.g., seven symbol periods for a normal cyclic prefix (as shown in FIG. 4) or six symbol periods for an extended cyclic prefix. The 2L symbol periods in each subframe are assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.4, 3, 5, 10 or 20 megahertz (MHz), respectively.

The time-frequency resources available for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value. On the downlink, an OFDM symbol may be transmitted in each symbol period of a subframe. On the uplink, an SC-FDMA symbol may be transmitted in each symbol period of a subframe.

FIG. 4 also shows exemplary transmissions of some reference signals on the downlink in LTE. A reference signal is a signal that is known a priori by a transmitter and a receiver and may also be referred to as pilot. An eNB may transmit a cell-specific reference signal (CRS) for each cell supported by the eNB in certain symbol periods of each subframe. A CRS is a reference signal that is specific for a cell, e.g., generated based on a cell identity (ID). The CRS may be used for various purposes such as channel measurement, coherent demodulation, etc. The eNB may also transmit a CSI reference signal (CSI-RS) for each cell supported by the eNB in certain symbol periods of certain subframes. The CSI-RS may be used for various purposes such as channel measurement, channel feedback reporting, etc. In the example shown in FIG. 4, the CSI-RS is transmitted every 5 ms in subframes 0 and 5 of each radio frame. The CSI-RS may also be transmitted with other periodicity and/or in other subframes.

Figures 5A, 5B:
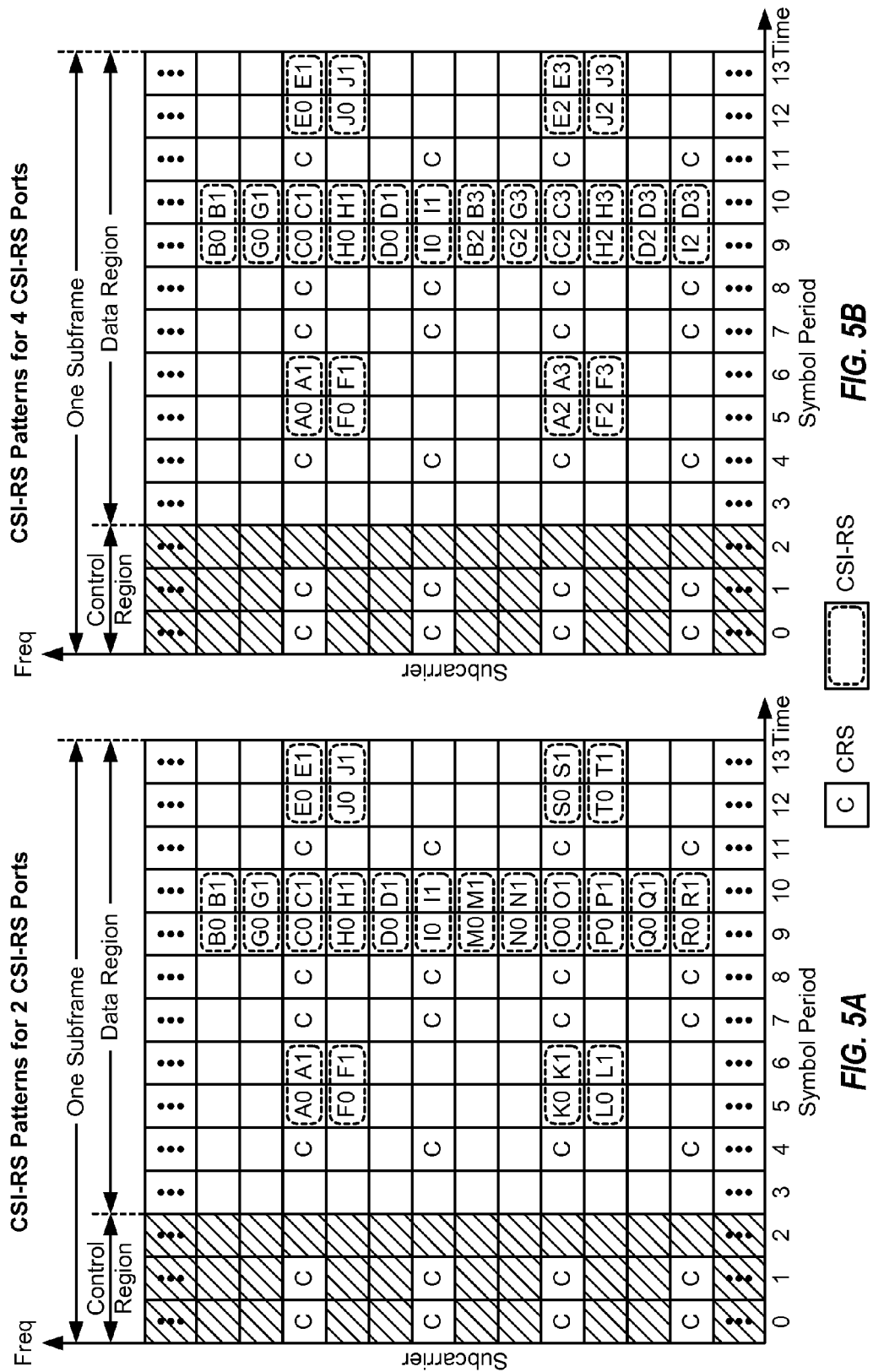
FIGS. 5A to 5C show CSI-RS patterns for two, four, and eight antenna ports, respectively.
Figure 5C:
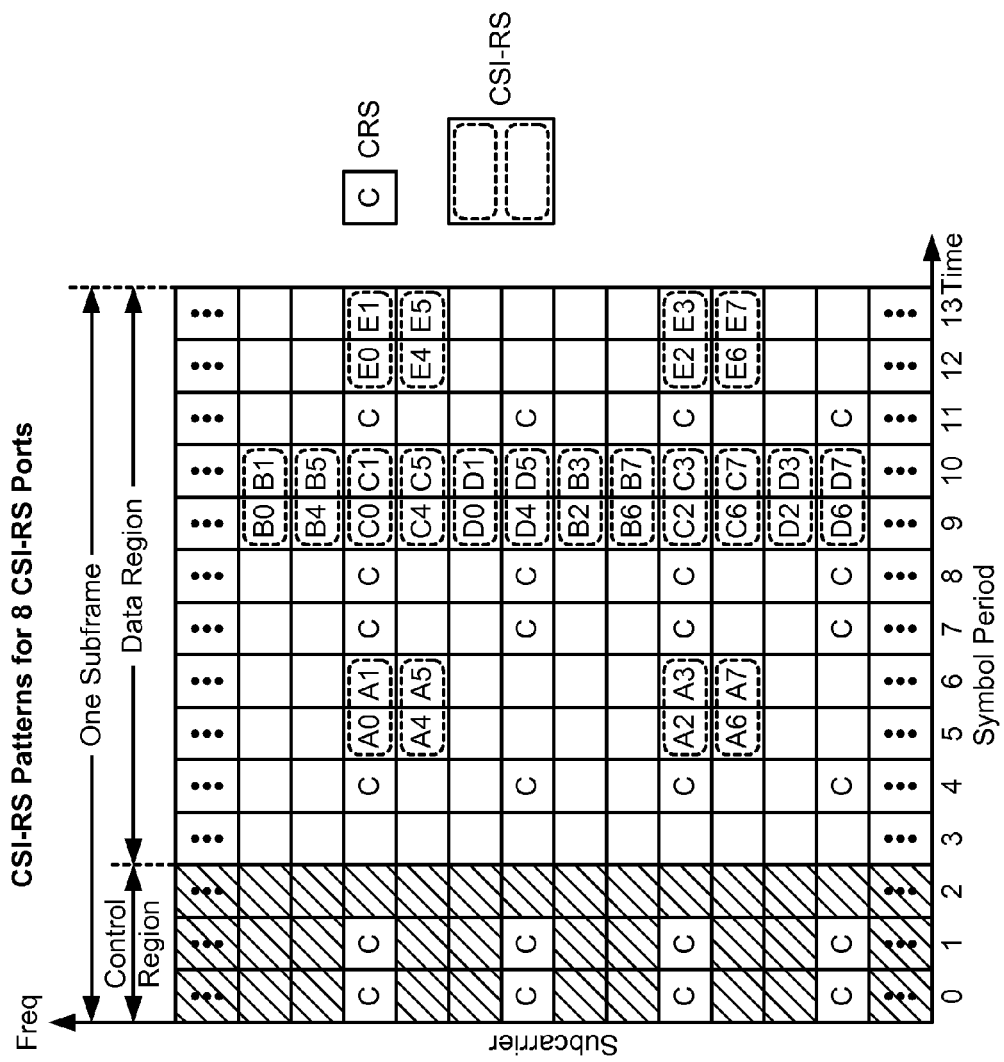

FIGS. 5A to 5C show transmission of the CRS by a node (e.g., a cell). For the normal cyclic prefix, the node may transmit the CRS (i) from two antenna ports in symbol periods 0, 4, 7 and 11 of a subframe or (ii) from four antenna ports in symbol periods 0, 1, 4, 7, 8 and 11 of the subframe. The node may transmit the CRS from two antenna ports in a given symbol period and on subcarriers spaced apart by six subcarriers for each antenna port. The subcarriers used for the CRS for antenna port 0 (or 2) may be interlaced with the subcarriers used for the CRS for antenna port 1 (or 3).

The node may also transmit the CSI-RS from one, two, four, or eight antenna ports for a cell. The antenna ports used for the CSI-RS may be referred to as CSI-RS ports, and the antenna ports used for the CRS may be referred to as CRS ports. The number of CSI-RS ports may or may not match the number of CRS ports.

FIG. 5A also shows a set of CSI-RS patterns for two CSI-RS ports 0 and 1 for FDD. Each CSI-RS pattern includes two resource elements within a dashed oval in one resource block pair. For example, one CSI-RS pattern includes two resource elements A0 and A1, another CSI-RS pattern includes two resource elements B0 and B1, etc. For each CSI-RS pattern, a node may transmit a first CSI-RS from CSI-RS port 0 using both resource elements (e.g., A0 and A1) and may also transmit a second CSI-RS from CSI-RS port 1 using both resource elements, with the first and second CSI-RS being code division multiplexed (CDM). A node may be assigned a particular CSI-RS pattern and may transmit the CSI-RS from two CSI-RS ports on two resource elements covered by the assigned CSI-RS pattern.

FIG. 5B shows a set of CSI-RS patterns for four CSI-RS ports 0 to 3 for FDD. Each CSI-RS pattern includes four resource elements within two dashed ovals in one resource block pair. For example, one CSI-RS pattern includes four resource elements A0 to A3, another CSI-RS pattern includes four resource elements B0 to B3, etc. A node may be assigned a particular CSI-RS pattern and may transmit the CSI-RS from four CSI-RS ports on four resource elements covered by the assigned CSI-RS pattern.

FIG. 5C shows a set of CSI-RS patterns for eight CSI-RS ports 0 to 7 for FDD. Each CSI-RS pattern includes eight resource elements within four dashed ovals in one resource block pair. For example, one CSI-RS pattern includes eight resource elements A0 to A7, another CSI-RS pattern includes eight resource elements B0 to B7, etc. A node may be assigned a particular CSI-RS pattern and may transmit the CSI-RS from eight CSI-RS ports on eight resource elements covered by the assigned CSI-RS pattern.

In general, a node may transmit CSI-RS from a CSI-RS port on two resource elements within a dashed oval. If the node has multiple CSI-RS ports, then the node may transmit the CSI-RS from two CSI-RS ports on two resource elements within one dashed oval using CDM.

As shown in FIGS. 5A to 5C, a node may transmit the CSI-RS from two, four, or eight CSI-RS ports. The CSI-RS patterns for two, four, and eight CSI-RS ports are nested, so that a CSI-RS pattern for a smaller number of CSI-RS ports is a subset of a CSI-RS pattern for a larger number of CSI-RS ports. For example, a CSI-RS pattern with resource elements A0 and A1 for two CSI-RS ports is a subset of a CSI-RS pattern with resource elements A0 to A3 for four CSI-RS ports, which is a subset of a CSI-RS pattern with resource elements A0 to A7 for eight CSI-RS ports. A CSI-RS pattern may be selected for a node such that the CSI-RS from the node does not collide (or minimally collides) with the CSI-RS from neighbor nodes. The different CSI-RS patterns may be viewed as time and/or frequency shifts of each other (i.e., symbol and/or subcarrier shift). Each eNB may be assigned a specific shift that does not change from subframe to subframe. Each CSI-RS pattern may be fixed, and the locations of resource elements for the CSI-RS may be fixed regardless of cell ID and may not change as a function of time or frequency. From a UE's perspective, a time-invariant time/frequency shift is used in a cell. The UE may be configured with a particular CSI-RS pattern and a particular periodicity by a cell and may look for the same CSI-RS pattern in all subframes in which the UE expects to receive the CSI-RS from the cell.

FIGS. 5A to 5C show CSI-RS patterns for different number of CSI-RS ports for FDD with the normal cyclic prefix. CSI-RS patterns may also be defined for different number of CSI-RS ports for FDD with the extended cyclic prefix, for TDD with the normal cyclic prefix, for TDD with the extended cyclic prefix, etc.

A node may transmit the CSI-RS on two resource elements from one CSI-RS port in a resource block pair if the node has one CSI-RS port. The node may transmit the CSI-RS on one resource element per CSI-RS port in a resource block pair if the node has multiple CSI-RS ports. The CSI-RS may thus be sparse in frequency and time. The CSI-RS may also be transmitted without precoding and may be used by all UEs for various purposes described above.

Table 1 lists a set of parameters that may be configured for a node for transmission of CSI-RS. This set of parameters may be part of a CSI-RS configuration for the node. Other parameters for transmission of the CSI-RS may also be configured for the node. The parameters for the CSI-RS configuration may be signaled via higher layers to UEs.

TABLE 1

Parameters for CSI-RS Configuration

| Parameter | Description | Possible Values |
| --- | --- | --- |
| Number of CSI-RS ports | Number of CSI-RS ports from which CSI-RS is transmitted | 1, 2, 4, 8 |
| CSI configuration/intra-subframe location index | CSI-RS pattern to use to transmit CSI-RS | 32/32/16/8 CSI-RS patterns for 1/2/4/8 CSI-RS ports |
| Duty cycle | Periodicity of CSI-RS transmission | 5, 10, 20, 40, 80 ms |
| Subframe offset | Specific subframes in which CSI-RS is transmitted | 0 to (duty cycle − 1) |
| Power offset, α | Offset between transmit power of PDSCH and transmit power of CSI-RS | |

The CSI-RS from a node may be used by UEs to determine CSI for the node. The CSI may include rank indication (RI), channel quality indication (CQI), precoding matrix indication (PMI), channel direction indication (CDI), etc. RI or rank may indicate the number of layers (or spatial channels) to use for data transmission. CQI may indicate the channel quality of each codeword or each layer. PMI may indicate a precoding matrix to use to precode data by a transmitter. CDI may indicate a spatial direction (e.g., a dominant eigenvector) for transmitting data. CSI may also include other information used to transmit data.

The CSI-RS may be transmitted by relays to support communication between eNBs and UEs. Referring back to FIG. 2, relay 120 may support communication between eNB 110 and UE 130. Relay 120 may be a transparent relay or a non-transparent relay. For a transparent relay, UE 130 does not need to be aware of the presence of the relay and performs processing in the same manner regardless of whether or not the relay is present. The transparent relay may transmit a Physical Downlink Shared Channel (PDSCH) carrying data for UEs and the CSI-RS. In one design, the transparent relay may not transmit a Physical Downlink Control Channel (PDCCH) carrying control information for UEs or the CRS. The transparent relay may be part of a donor eNB and may not have a cell ID of its own (but may have a relay ID). At least part of Radio Resource Management (RRM) may be controlled by the donor eNB, while parts of the RRM may be located in the transparent relay. For a non-transparent relay, UE 130 is aware of the presence of the relay and may perform processing specifically for the relay. The non-transparent relay may be considered as an eNB and may have its own cell ID. The non-transparent relay may transmit the PDCCH, PDSCH, CRS, and CSI-RS.

The wireless network may support hybrid automatic repeat request (HARQ). For HARQ, a transmitter (e.g., an eNB) may send a transmission of a transport block (or packet) to a receiver (e.g., a UE) and may send one or more additional transmissions until the transport block is decoded correctly by the receiver, or the maximum number of transmissions has been sent, or some other termination condition is encountered. The first transmission of the transport block may be referred to as a new transmission, and each additional transmission of the transport block may be referred to as a retransmission. After each transmission of the transport block, the receiver may decode all received transmissions of the transport block to attempt to recover the transport block.

For HARQ on the downlink in FIG. 2, eNB 110 may send a first transmission of a transport block on the downlink. eNB 110 may send the first transmission (i) at a rate selected so that only relay 120 can correctly decode the transport block after the first transmission and/or (ii) at a rate selected so that UE 130 can correctly decode the transport block after a target number of transmissions. Relay 120 and UE 130 may each receive the first transmission from eNB 110 and may decode the first transmission to recover the transport block. Relay 120 may have a good channel to eNB 110 and may be able to correctly decode the transport block based on the first transmission. UE 130 may have a worse channel to eNB 110, may decode the transport block in error, and may send a negative acknowledgement (NAK) on the uplink. In response to the NAK, only relay 120 or both eNB 110 and relay 120 may send a second transmission (or retransmission) of the transport block to UE 130. UE 130 may receive the second transmission of the transport block and may decode the first and second transmissions to recover the transport block. Subsequent transmissions of the transport block (if any) to UE 130 may occur in similar manner.

Relay 120 may thus assist with data transmission on the downlink from eNB 110 to UE 130 by sending one or more transmissions of a transport block to UE 130 after successfully decoding the transport block from eNB 110. Relay 120 may also assist with data transmission on the uplink from UE 130 to eNB 110 by sending one or more transmissions of a transport block to eNB 110 after successfully decoding the transport block from UE 130. For data transmission on the downlink, UE 130 may coherently combine the transmissions from relay 120 and eNB 110 if both transmit simultaneously to UE 130. Relay 120 may transmit data in a manner such that the transmission from relay 120 may appear to UE 130 as if it is from eNB 110. Hence, UE 130 would not need to perform any special combining of the transmissions from relay 120 and eNB 110. For data transmission on the uplink, eNB 110 may coherently combine the transmissions from relay 120 and UE 130 if both transmit simultaneously to eNB 110.

The CSI-RS may also be transmitted by cells to support CoMP transmission. Each cell may transmit the CSI-RS, which may be used by UEs for channel estimation. A UE may estimate the channel response for each cell in a CoMP measurement set based on the CSI-RS received from that cell. The UE may obtain a channel matrix $H_m$ for each cell m. In one design, the UE may perform singular value decomposition of the channel matrix as $H_m = U_m \Sigma_m V_m^H$ and may obtain a matrix $V_m$ of eigenvectors for eigenmodes of the channel from cell m to the UE. The UE may quantize Q best eigenvectors for cell m based on a codebook to obtain channel vectors for cell m. The UE may also determine channel vectors for each cell of interest in other manners. In any case, a channel vector may include (i) a channel direction indicative of the direction of a spatial beam and (ii) a magnitude indicative of the strength of the spatial beam. The UE may send CSI comprising the channel vectors for all cells of interest to support CoMP transmission to the UE.

In general, a UE may determine and report CSI to support data transmission from multiple nodes to the UE. The nodes may transmit the CSI-RS such that the CSI-RS from the nodes coincide in some subframes and not coincide in other subframes. The UE may determine CSI for each node or each combination of nodes based on the CSI-RS received from the node(s). The UE may determine and report CSI for different nodes or different combinations of nodes without being aware that multiple nodes are involved.

For the relay scenario shown in FIG. 2, UE 130 may determine CSI based on the CSI-RS transmitted by eNB 110 and/or the CSI-RS transmitted by relay 120. In one design, one or more of the following CSI-RS combinations may be supported:
 1. CSI-RS transmitted by only eNB 110—used by UE 130 to measure the direct downlink (and also possibly used by relay 120 to measure the backhaul downlink) and determine CSI for only eNB 110,
 2. CSI-RS transmitted by only relay 120—used by UE 130 to measure the access downlink and determine CSI for only relay 120, and
 3. CSI-RS transmitted by both eNB 110 and relay 120—used by UE 130 to determine CSI for both eNB 110 and relay 120.

CSI-RS combinations 1, 2 and 3 above may be used to support transmission from only eNB 110, or transmission from only relay 120, or joint transmission from both eNB 110 and relay 120 for retransmission of a transport block. The CSI-RS configurations for eNB 110 and relay 120 may be such that the CSI-RS from eNB 110 and the CSI-RS from relay 120 are orthogonal in some subframes and overlap in some other subframes. The CSI-RS overlaps when they are transmitted by eNB 110 and relay 120 on the same time-frequency resources. Hence, the CSI-RS from eNB 110 would appear by itself some of the time, the CSI-RS from relay 120 would appear by itself some other time, and CSI-RS from both eNB 110 and relay 120 would overlap some of the time. In another design, the CSI-RS from eNB 110 and relay 120 may be transmitted in the same subframe but orthogonal resources (e.g., using different time, frequency, and/or code resources) and may appear to UE 130 as CSI-RS from an eNB with a larger number of CSI-RS ports. This may be achieved in various manners, as described below.

CSI-RS combinations 1 and 2 above may be used to support transmission from only eNB 110 or transmission from only relay 120 for retransmission of a transport block. The CSI-RS configurations for eNB 110 and relay 120 may be such that the CSI-RS from eNB 110 is orthogonal to the CSI-RS from relay 120. This may be achieved by having eNB 110 and relay 120 transmit their CSI-RS in different subframes, or on different time-frequency resources in the same subframe, etc.

For the CoMP scenario shown in FIG. 3, UE 132 may determine CSI based on the CSI-RS transmitted by each cell. In one design, one or more of the following CSI-RS combinations may be supported:
 1. CSI-RS transmitted by only one cell—used by UE 132 to measure the downlink channel and determine CSI for the one cell, and
 2. CSI-RS transmitted by multiple cells—used by UE 132 to measure the downlink channel and determine CSI for the multiple cells.

For CSI-RS combination 2 above, the multiple cells may transmit their CSI-RS on the same or different time-frequency resources in a given subframe. If the cells transmit their CSI-RS on different time-frequency resources, then UE 132 can determine CSI for each cell based on the CSI-RS transmitted by that cell. If the cells transmit their CSI-RS on the same time-frequency resources, then UE 132 can determine CSI for the overall channel for these cells.

In general, any number of CSI-RS combinations may be supported. Each CSI-RS combination may correspond to CSI-RS from a different node or a different combination of nodes. The CSI-RS combinations listed above for the relay scenario and the CoMP scenario may be supported in various manners. Some exemplary designs of CSI-RS transmission by two nodes are described below.

Figure 6:
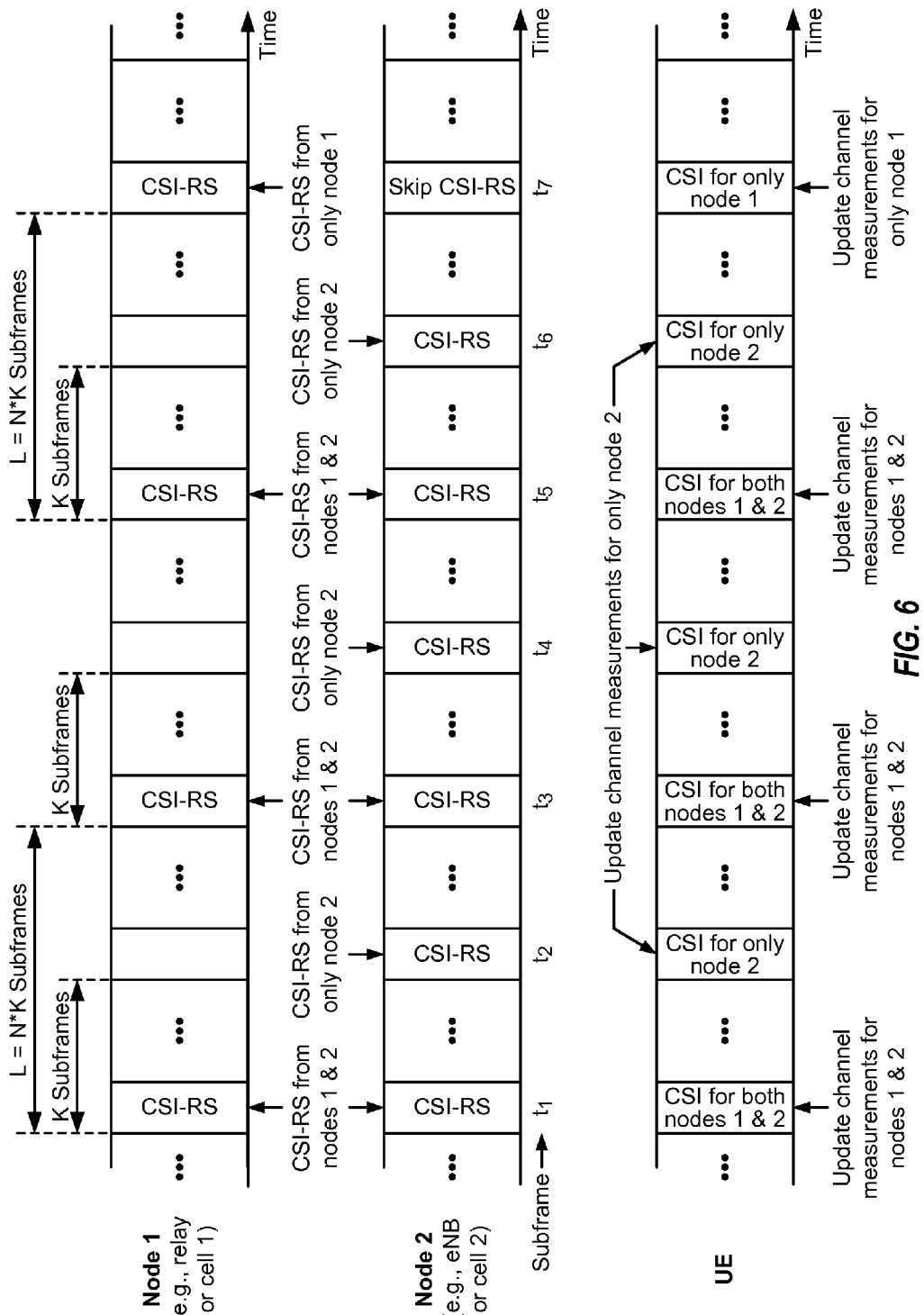
FIGS. 6, 7 and 8 show three designs of transmitting reference signals by two nodes so that the reference signals coincide in some subframes but not other subframes.

FIG. 6 shows a first design of supporting the CSI-RS combinations described above with different CSI-RS periodicities for two nodes 1 and 2. For the relay scenario shown in FIG. 2, node 1 may correspond to relay 120, and node 2 may correspond to eNB 110. For the CoMP scenario in FIG. 3, nodes 1 and 2 may correspond to two cells in a CoMP measurement set. The CoMP measurement set may also include additional cells, which are not shown in FIG. 6 for simplicity.

In the design shown in FIG. 6, node 2 may transmit its CSI-RS with a periodicity of K subframes, where K may be 5, 10, 20, 40, 80 or some other value. Node 1 may transmit its CSI-RS with a periodicity of L subframes, where L may be an integer multiple of K. The subframe offset for the CSI-RS from node 1 and the subframe offset for the CSI-RS from node 2 may be selected such that node 1 transmits its CSI-RS in the same subframes that node 2 transmits its CSI-RS. In one design, the CSI-RS configurations of nodes 1 and 2 may be signaled to a UE. In another design, the CSI-RS configuration of node 2 (but not the CSI-RS configuration of node 1) may be signaled to the UE.

In one design, the UE may receive (i) the CSI-RS from only node 2 in some subframes (e.g., subframes $t_2$, $t_4$ and $t_6$) and (ii) the CSI-RS from both nodes 1 and 2 in some other subframes (e.g., subframes $t_1$, $t_3$ and $t_5$). In one design, node 2 may skip transmission of its CSI-RS in some subframes (e.g., subframe $t_7$) in which node 1 transmits its CSI-RS. The UE may then receive the CSI-RS from only node 1 in these subframes and determine CSI for node 1. In another design, node 2 may transmit its CSI-RS in all subframes in which node 1 transmits its CSI-RS. The UE may then determine CSI for only node 1 based on (i) a channel estimate derived for node 2 based on the CSI-RS from only node 2 and (ii) a composite channel estimate derived for both nodes 1 and 2 based on the CSI-RS from both nodes 1 and 2.

As shown in FIG. 6, the UE may have knowledge of the CSI-RS configurations of nodes 1 and 2 and may determine CSI based on this knowledge. In each subframe in which both nodes 1 and 2 transmit their CSI-RS, the UE may update channel measurements for both nodes based on the CSI-RS from these nodes. In each subframe in which only node 1 transmits its CSI-RS, the UE may update channel measurements for node 1 based on the CSI-RS from this node. In each subframe in which only node 2 transmits its CSI-RS, the UE may update channel measurements for node 2 based on the CSI-RS from this node. For example, in a given subframe, the UE may filter channel measurements for only node(s) that transmit CSI-RS in that subframe and not for other nodes not transmitting CSI-RS in the subframe. In the example shown in FIG. 6, the UE may update the channel measurements for both nodes 1 and 2 in subframe $t_1$, then subframe $t_3$, then subframe $t_5$, etc. The UE may update the channel measurements for node 2 in subframe $t_2$, then subframe $t_4$, then subframe $t_6$, etc. The UE may update the channel measurements for node 1 in subframe $t_7$, etc.

Figure 7:
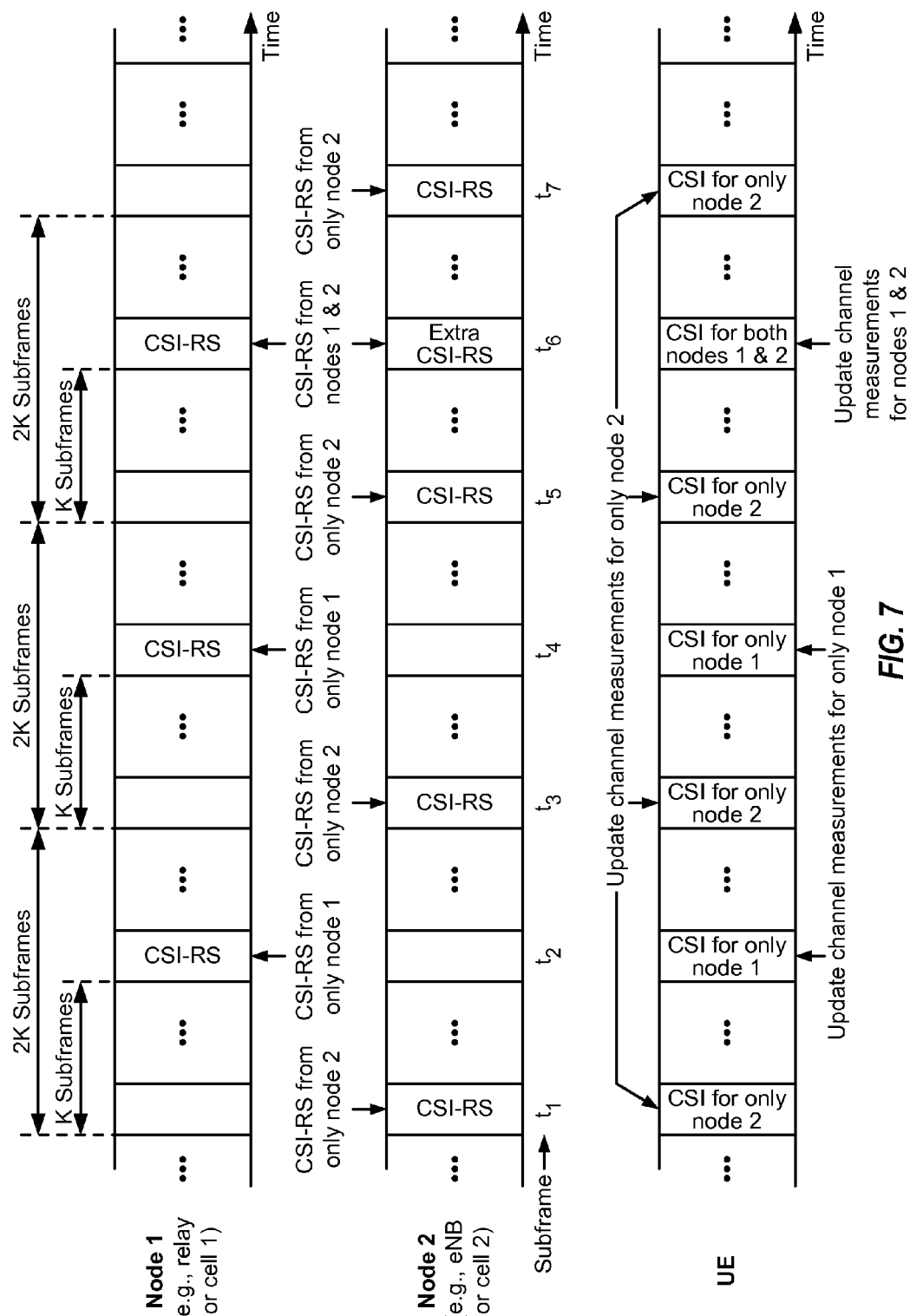

FIG. 7 shows a second design of supporting the CSI-RS combinations described above with the same CSI-RS periodicity for two nodes 1 and 2. In this design, node 1 may transmit its CSI-RS with a periodicity of 2K subframes, where K may be any suitable value. Node 2 may transmit its CSI-RS with a periodicity of 2K subframes. Subframe offsets may be selected such that the subframes in which node 1 transmits its CSI-RS may be interlaced with the subframes in which node 2 transmits its CSI-RS. The CSI-RS for both nodes 1 and 2 may then appear to have a periodicity of K subframes. The CSI-RS configurations of nodes 1 and 2 may be signaled to a UE. Alternately, the UE may not be aware of the two nodes and may be configured with a CSI-RS configuration having a periodicity of K. The UE may then use the CSI-RS from the two nodes as if they were from a single node.

As shown in FIG. 7, the UE may receive (i) the CSI-RS from only node 1 in some subframes (e.g., subframes $t_2$, $t_4$ and $t_6$) and (ii) the CSI-RS from only node 2 in some other subframes (e.g., subframes $t_1$, $t_3$, $t_5$ and $t_7$). In one design, node 2 may occasionally transmit its CSI-RS in some subframes (e.g., subframe $t_6$) in which node 1 transmits its CSI-RS, as shown in FIG. 7. In another design, node 1 may occasionally transmit its CSI-RS in some subframes (e.g., subframe $t_3$) in which node 2 transmits its CSI-RS (not shown in FIG. 7). For both designs, the UE may determine CSI for both nodes 1 and 2 based on the CSI-RS from both nodes in the subframes in which both nodes transmit their CSI-RS. The UE may determine CSI for only node 1 (or only node 2) based on the CSI-RS from node 1 (or node 2) in the subframes in which only node 1 (or only node 2) transmit its CSI-RS.

Figure 8:
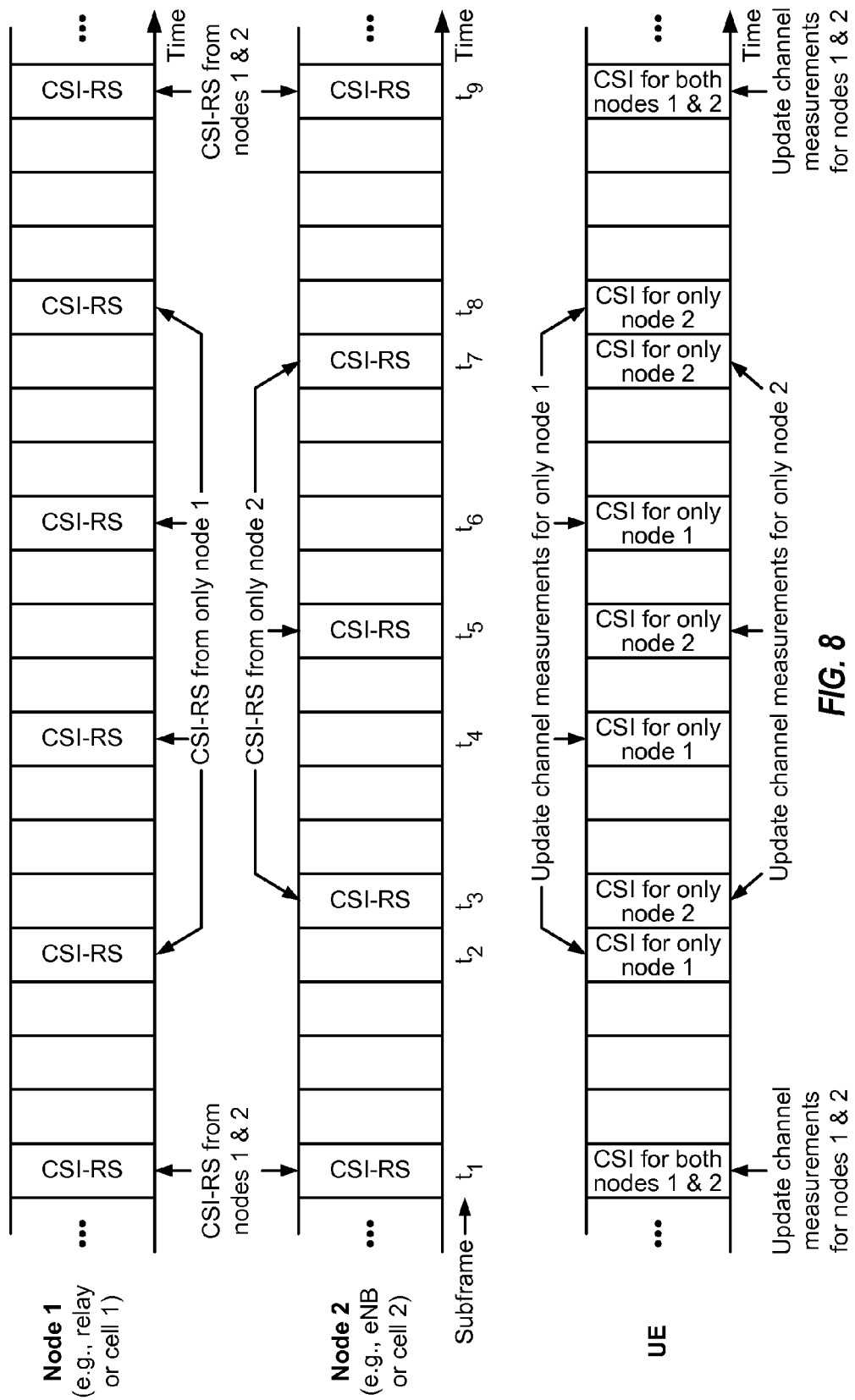

FIG. 8 shows a third design of supporting the CSI-RS combinations described above with different CSI-RS periodicities for two nodes 1 and 2. In this design, node 1 may transmit its CSI-RS with a first periodicity (e.g., of 4 subframes). Node 2 may transmit its CSI-RS with a second periodicity (e.g., of 5 subframes), which may be different from the first periodicity. The first and second periodicities may be mutually prime. The subframes in which node 1 transmits its CSI-RS may occasionally coincide with the subframes in which node 2 transmits its CSI-RS. The periodicity of the subframes in which both nodes 1 and 2 transmit their CSI-RS may be dependent on the first and second periodicities. The CSI-RS configurations of nodes 1 and 2 may or may not be signaled to a UE.

As shown in FIG. 8, the UE may receive (i) the CSI-RS from only node 1 in some subframes (e.g., subframes $t_2$, $t_4$, $t_6$ and $t_8$), (ii) the CSI-RS from only node 2 in some other subframes (e.g., subframes $t_3$, $t_5$ and $t_7$), and (iii) the CSI-RS from both nodes 1 and 2 in yet some other subframes (e.g., subframes $t_1$ and $t_9$). The UE may determine CSI for both nodes 1 and 2 based on the CSI-RS from both nodes in the subframes in which both nodes transmit their CSI-RS. The UE may determine CSI for only node 1 (or only node 2) based on the CSI-RS from node 1 (or node 2) in the subframes in which only node 1 (or only node 2) transmit its CSI-RS.

In a fourth design of supporting the CSI-RS combinations described above, nodes 1 and 2 may transmit their CSI-RS on different antenna ports in the same subframes. A sufficient number of antenna ports may be advertised to a UE for the CSI-RS. For example, node 1 may advertise a CSI-RS configuration with eight antenna ports for the CSI-RS and a specific 8-port CSI-RS pattern. Node 1 may transmit its CSI-RS from four antenna ports (e.g., antenna ports 0 to 3), and node 2 may transmit its CSI-RS from four other antenna ports (e.g., antenna ports 4 to 7). The CSI-RS from node 1 and the CSI-RS from node 2 may be transmitted on different resource elements and may be orthogonal to one another. In one design, node 1 may occasionally transmit its CSI-RS on the antenna ports used by node 2 for its CSI-RS. In another design, node 2 may occasionally transmit its CSI-RS on the antenna ports used by node 1 for its CSI-RS. In yet another design, nodes 1 and 2 may occasionally transmit their CSI-RS on all antenna ports. For all designs, a UE may determine CSI for only node 1 based on the CSI-RS from the antenna ports used by only node 1 for its CSI-RS. The UE may determine CSI for only node 2 based on the CSI-RS from the antenna ports used by only node 2 for its CSI-RS. The UE may determine CSI for both nodes 1 and 2 based on the CSI-RS from the antenna ports used by both nodes for their CSI-RS. For example, the UE may report CSI corresponding to joint transmission schemes where precoding is performed across the antennas of both nodes. In general, CSI for both nodes 1 and 2 may refer to (i) one CSI report for node 1 and another CSI report for node 2, or (ii) a CSI report where at least one antenna port of node 1 and at least one antenna port of node 2 are virtualized to form one antenna port, or (iii) a CSI report corresponding to a CoMP scheme such as joint transmission.

Four exemplary designs for supporting CSI-RS transmission by multiple nodes have been described above. CSI-RS transmission by multiple nodes may also be supported in other manners.

In another design, only CSI-RS combinations 1 and 2 for the relay scenario may be supported. For example, CSI-RS from only eNB 110 and CSI-RS from only relay 120 may be supported. In this case, UE 130 may derive CSI for CSI-RS combination 3 based on CSI-RS received separately from eNB 110 and relay 120 for the two supported CSI-RS combinations. UE 130 may derive a direct channel estimate based on the CSI-RS received from only eNB 110, derive an access channel estimate based on the CSI-RS received from only relay 120, and determine a composite channel estimate based on the direct channel estimate and the access channel estimate. UE 130 may then determine CSI (e.g., RI and CQI) for both eNB 110 and relay 120 based on the composite channel estimate. UE 130 may thus overlap the CSI-RS from eNB 110 and the CSI-RS from relay 120 on its own.

In one design, a UE may determine CSI separately for each CSI-RS combination. For example, the UE may determine CSI for node 1 based on only the CSI-RS from node 1, determine CSI for node 2 based on only the CSI-RS from node 2, and determine CSI-RS for both nodes 1 and 2 based on the CSI-RS from both nodes 1 and 2. The UE may determine when and where (e.g., which subframes and which resource elements) the CSI-RS is transmitted by each node based on a CSI-RS configuration for that node. The UE may determine when and where the CSI-RS is transmitted concurrently by multiple nodes based on the CSI-RS configurations for these nodes and/or other information. The UE may make measurements of the CSI-RS received in each subframe and may identify the node(s) transmitting the CSI-RS in the subframe. The UE may determine whether to combine (e.g., filter) the CSI-RS measurements based on CSI-RS configurations of different nodes. For example, in FIG. 8, the UE may obtain CSI-RS measurements for nodes 1 and 2 in subframe $t_1$ and may combine these CSI-RS measurements with prior CSI-RS measurements for nodes 1 and 2. The UE may obtain CSI-RS measurements for node 1 in subframe $t_2$ and may combine these CSI-RS measurements with prior CSI-RS measurements for node 1. The UE may obtain CSI-RS measurements for node 2 in subframe $t_3$ and may combine these CSI-RS measurements with prior CSI-RS measurements for node 2. The UE may process each CSI-RS combination in similar manner as the CSI-RS from a different cell.

In one design, the UE may not be aware of one or multiple nodes transmitting the CSI-RS, and a node (e.g., an eNB) may determine which node or combination of nodes is covered by each CSI report. The UE may combine different channel measurements to obtain a joint channel measurement, as discussed above. However, a node (e.g., an eNB) typically would not combine CSI reported by the UE for individual transmissions on order to obtain CSI for a joint transmission.

In general, the UE may determine CSI for each CSI-RS combination based on the CSI-RS measurements for that CSI-RS combination. For example, the UE may determine RI for a CSI-RS combination based on the CSI-RS measurements for that combination. The UE may determine CQI and PMI for the CSI-RS combination based on the RI and CSI-RS measurements for that CSI-RS combination.

In one design, a node may avoid transmitting data on resource elements used by the node to transmit the CSI-RS. This may be achieved with puncturing or rate matching. For puncturing, the node may process (e.g., encode and modulate) a transport block and generate data symbols for resource elements available for data transmission as well as resource elements used for the CSI-RS. The node may then map the data symbols to these resource elements and may delete (or puncture) the data symbols mapped to the resource elements used for the CSI-RS. For rate matching, the node may process a transport block and generate data symbols for only resource elements available for data transmission. The node may then map the data symbols to the resource elements used for data transmission. The node (e.g., eNB 110) may perform puncturing or rate matching for resource elements used by the node to transmit its CSI-RS. The node may also perform puncturing or rate matching for resource elements used by other nodes (e.g., relay 120) to transmit their CSI-RS. The node may thus mute its transmission on resource elements used for the CSI-RS by other nodes.

In general, data may be sent to a UE based on the UE's assumption of the CSI-RS pattern being used. If the UE expects the CSI-RS, then data may be rate-matched around the CSI-RS regardless of whether or not the CSI-RS is actually transmitted. For example, a node (e.g., eNB 110) may perform rate matching for the UE in subframes in which the node does not transmit the CSI-RS but another node (e.g., relay 120) does transmit the CSI-RS. Conversely, if the UE does not expect the CSI-RS, then data may be sent on all resource elements or punctured on resource elements used for the CSI-RS.

In general, multiple nodes may transmit data to a UE, and each node may have any number of antenna ports. An antenna port may correspond to a physical antenna or a virtual antenna. The number of antenna ports for a given node (e.g., eNB 110) may or may not match the number of antenna ports for another node (e.g., relay 120). This mismatch in the number of antenna ports may pose certain problems. For example, in the transparent relay case, CSI reports corresponding to transmission from eNB 110 to UE 130 and CSI reports corresponding to transmission from relay 120 to UE 130 may both be required, with eNB 110 and relay 120 having different numbers of antenna ports. However, UE 130 may have one CSI-RS configuration for one number of antenna ports. A mismatch in the number of antenna ports for different nodes may be addressed in various manners.

In one design, a given node X (e.g., relay 120) may form $N_{VA}$ virtual antennas based on its $N_X$ physical antennas so that the number of virtual antennas at node X matches the number of physical antennas $N_Y$ at another node Y (e.g., eNB 110). If node X has more physical antennas than node Y (i.e., $N_X > N_Y$), then node X may form $N_{VA}$ virtual antennas in several manners. For example, if $N_X=4$ and $N_Y=2$, then node X may perform cyclic delay diversity (CDD) on the first two physical antennas to form a first virtual antenna and may also perform CDD on the last two physical antennas to form a second virtual antenna. Alternatively, node X may form $N_Y$ virtual antennas with a $N_Y \times N_X$ precoding matrix, which may be a subset of a discrete Fourier transform (DFT) matrix, a Walsh-Hadamard matrix, or some other matrix. If node X has fewer physical antennas than node Y (i.e., $N_X < N_Y$), then node X may form $N_Y$ virtual antennas with $N_Y$ precoding vectors that may not be orthogonal to one another. For example, if $N_X=2$ and $N_Y=4$, then node X may form four virtual antennas with four precoding vectors [1 0], [0 1], [1 1]/$\sqrt{2}$, and [1 −1]/$\sqrt{2}$.

For the relay scenario shown in FIG. 2, relay 120 may form $N_{eNB}$ virtual antennas based on its $N_{relay}$ physical antennas to match $N_{eNB}$ physical antennas at eNB 110. Alternatively, eNB 110 may form $N_{relay}$ virtual antennas based on its $N_{eNB}$ physical antennas to match $N_{relay}$ physical antennas at relay 120.

Multiple nodes may transmit data to a UE and may have the same number of antenna ports. The number of antenna ports for a given node X may be made equal to the number of antenna ports for another node Y based on any of the designs described above. Node X (e.g., relay 120) may map each of its antenna ports to a corresponding one of the antenna ports of node Y (e.g., eNB 110). There may be a one-to-one mapping between the antenna ports of node X and the antenna ports of node Y. In one design, node X may transmit data and CSI-RS from its antenna ports to the UE in similar manners as node Y. For example, if node Y performs precoding for transmission, then node X may also perform precoding in the same manner as node Y. The UE may not be able to distinguish the transmissions from node X and the transmissions from node Y.

Multiple nodes may transmit data to a UE and may have different numbers of antenna ports. In one design, if a given node X has fewer antenna ports than another node Y, then node X may avoid transmitting on the resource elements for the CSI-RS for the additional antenna ports.

A UE may determine CSI based on the CSI-RS from multiple nodes transmitting to the UE. The CSI may include RI, CQI, and/or other information. In one design, the UE may report RI and CQI separately in different subframes and with different periodicities. For example, the UE may report RI with a lower periodicity (i.e., less often) then CQI. The UE may report RI in certain subframes and may report CQI (assuming the reported RI) in other subframes. RI and CQI determined by the UE for different CSI-RS combinations may be very different.

In one design, a UE may be configured with suitable reporting periodicities for RI and CQI to enable the UE to report RI and CQI for each CSI-RS combination. For example, in FIG. 7, the UE may report RI with a first periodicity of K subframes or shorter and may report CQI with a second periodicity that may be equal to or shorter than the first periodicity. This would allow the UE to report RI and CQI based on the CSI-RS from only node 1, then report RI and CQI based on the CSI-RS from only node 2, etc. For example, K may be equal to 10, node 1 may transmit its CSI-RS every 20 ms, node 2 may transmit its CSI-RS every 20 ms, and the UE may observe the CSI-RS from either node 1 or 2 every 10 ms. The UE may report RI every 10 ms and may report CQI every 2 ms (e.g., for different subbands in different CQI reporting intervals). The UE may report RI and CQI in separate reports sent in different subframes or in the same report. If the CSI-RS periodicities for nodes 1 and 2 are aperiodic (e.g., as shown in FIG. 8), then the UE may report RI and/or CQI aperiodically (e.g., as configured for the UE). The UE may also send a report for RI and/or CQI whenever requested (e.g., whenever a CQI request is received by the UE from a serving eNB or cell).

In general, a node may transmit data to a UE based on any suitable rank. The UE may determine rank based on the CSI-RS from the node and may report the rank to the node.

In another aspect, different transmissions of data may be sent with different ranks to improve performance. A first transmission of data may be sent with a particular rank, and a subsequent transmission of the data may be sent with a higher rank or a lower rank. For the relay scenario shown in FIG. 2, UE 130 may support a lower rank (e.g., rank 1) for data transmission from only eNB 110 and may support a higher rank (e.g., rank 2) for data transmission from both eNB 110 and relay 120 (or from only relay 120). This may be due to better signal quality of the combined signal from both eNB 110 and relay 120 than the signal from only eNB 110. This may also be due to the relay antennas and the eNB antennas transmitting different signals and being treated as an antenna array rather than being combined to form virtual antennas. A lower rank may also be used for the first transmission to ensure that relay 120 can correctly decode the data based on the first transmission. A higher rank may be used for subsequent transmissions in order to improve performance.

In one design, a UE may be informed of a rank used for each transmission of data to the UE. For example, a downlink grant carrying the rank may be sent with each transmission of data to the UE. The UE may obtain received symbols from each transmission based on the rank used for that transmission. The UE may process (e.g., demodulate and decode) the received symbols for all received transmissions to recover the data. The use of a higher rank for subsequent transmissions may enable the UE to obtain higher data rates and/or recover the data with fewer transmissions.

Figures 9, 10:
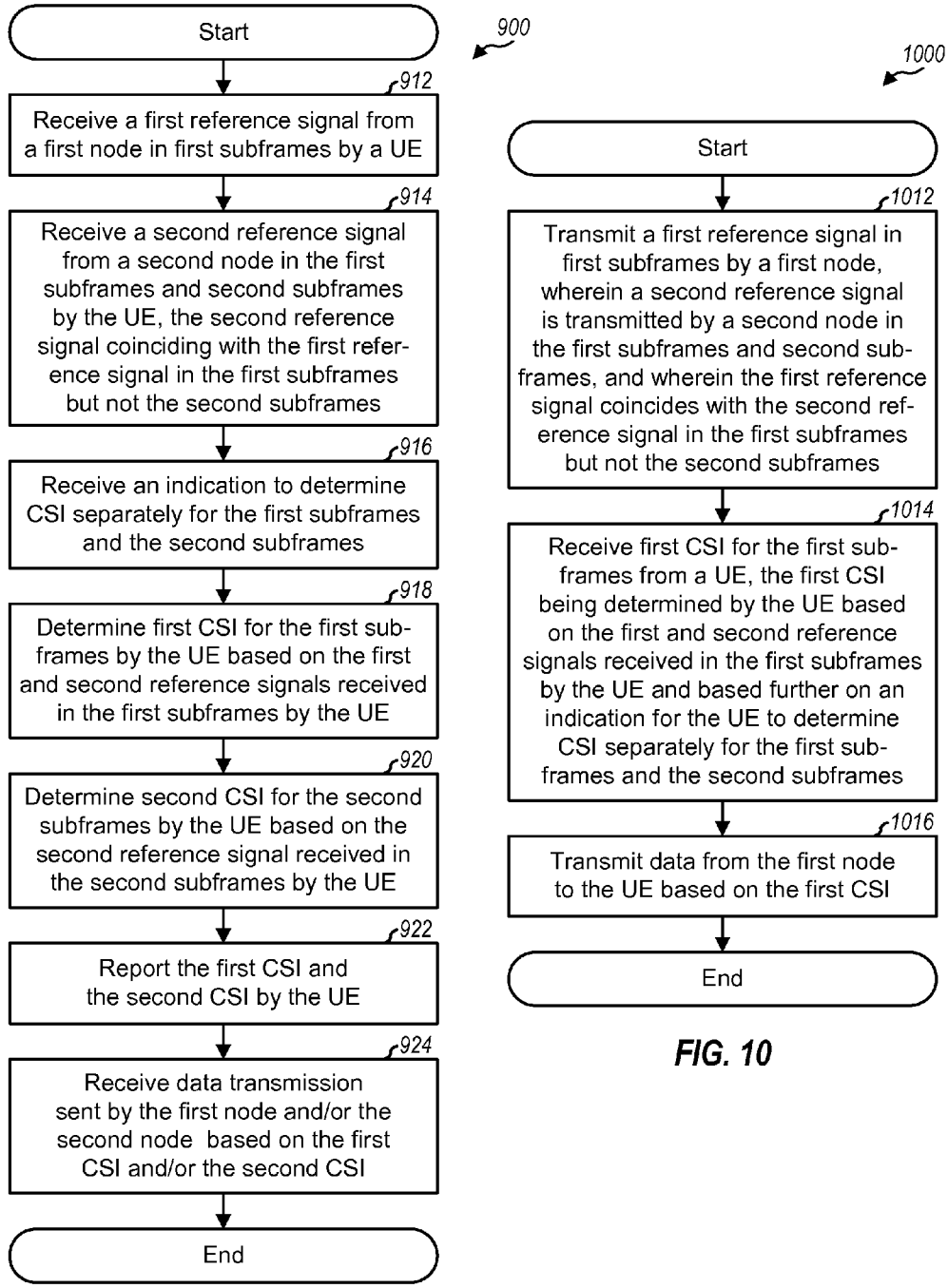
FIG. 9 shows a process for communication by a UE.
FIG. 10 shows a process for supporting communication by a node.

FIG. 9 shows a design of a process 900 for communication by a UE. The UE may receive a first reference signal from a first node in first subframes (block 912). The UE may receive a second reference signal from a second node in the first subframes and second subframes (block 914). The second reference signal may coincide with the first reference signal in the first subframes but not the second subframes. The first and second reference signals may be transmitted on the same set of resources or different sets of resources in the first subframes. The UE may also receive the first reference signal from the first node in third subframes. The first reference signal may not coincide with the second reference signal in the third subframes. The first and second reference signals may each be a CSI-RS or some other reference signal.

The UE may receive an indication to determine CSI separately for the first subframes and the second subframes (block 916). The UE may receive this indication based on a first CSI-RS configuration for the first node and a second CSI-RS configuration for the second node. The UE may also receive this indication in other manners. The UE may determine first CSI for the first subframes based on the first and second reference signals received in the first subframes by the UE (block 918). The UE may determine second CSI for the second subframes based on the second reference signal received in the second subframes by the UE (block 920). Each CSI may comprise RI, CQI, PMI, CDI, or a combination thereof. The UE may report the first CSI and the second CSI (block 922). The UE may thereafter receive data transmission sent by only the first node, or only the second node, or both the first and second nodes based on the first CSI and/or the second CSI (block 924). The UE may also determine third CSI for the third subframes based on the first reference signal received in the third subframes by the UE. The UE may report the third CSI and may receive the data transmission sent by the first node and/or the second node base further on the third CSI.

The UE may or may not know which node or nodes transmit a reference signal in each subframe. The UE may be configured to measure and report CSI separately for the first and second subframes and may then determine CSI separately for each set of subframes in which the UE is configured to measure and report CSI separately. The first node and/or the second node may determine which node or nodes are covered by each reported CSI. In one design, the UE may report CSI for or in subframe n and may use reference signal(s) received more recently than subframe n−k, where n and k may each be any suitable value. In this design, the first node and/or the second node may determine which reference signal(s) were used by the UE to determine each reported CSI based on when the CSI was reported by the UE.

In one design, the first node may correspond to a relay, and the second node may correspond to a base station. In block 924, the UE may receive the data transmission sent by only the relay based on the first CSI for the relay, or sent by only the base station based on the second CSI for the base station, or sent by both the relay and the base station based on the first CSI and the second CSI. In another design, the first and second nodes may correspond to two cells supporting CoMP transmission to the UE. In block 924, the UE may receive the data transmission sent by only one cell with precoding based on the CSI for that cell, or sent by the two cells with precoding based on the first CSI and the second CSI for the two cells.

In one design of blocks 912 and 914, the UE may receive the first reference signal from the first node at a first periodicity and may receive the second reference signal from the second node at a second periodicity different from the first periodicity, e.g., as shown in FIGS. 6 and 8. The UE may receive both the first and second reference signals at a third periodicity, which may be equal to the first periodicity or different from the first and second periodicities. For the design shown in FIG. 6, the first subframes may correspond to subframes $t_1$, $t_3$ and $t_5$ (CSI-RS from both Node 1 and Node 2), the second subframes may correspond to subframes $t_2$, $t_4$ and $t_6$ (CSI-RS from only Node 2), and the third subframes may correspond to subframes $t_7$ (CSI-RS from only Node 1).

For the design shown in FIG. 8, the first subframes may correspond to subframes $t_1$ and $t_9$, the second subframes may correspond to subframes $t_3$, $t_5$ and $t_7$, and the third subframes may correspond to subframes $t_2$, $t_4$ and $t_6$. In one design, the first periodicity may be an integer multiple of (and less frequent than) the second periodicity, e.g., as shown in FIG. 6. In this design, the second reference signal may not be transmitted in some designated subframes (e.g., subframe $t_7$ in FIG. 6) within the second periodicity by the second node to enable the UE to receive the first reference signal from only the first node in the designated subframes. In another design, the first periodicity may be a non-integer multiple of the second periodicity, e.g., as shown in FIG. 8.

In another design of blocks 912 and 914, the UE may receive the first reference signal from the first node at a first periodicity in third subframes and may receive the second reference signal from the second node at the first periodicity in the second subframes, e.g., as shown in FIG. 7. The second subframes may be interlaced with the third subframes, and the UE may receive the first or second reference signal at a second periodicity that is twice more frequent than the first periodicity. In the design shown in FIG. 7, the first subframes may correspond to subframes $t_6$, the second subframes may correspond to subframes $t_1$, $t_3$ and $t_5$, and the third subframes may correspond to subframes $t_2$ and $t_4$. The first subframes may correspond to a subset of the third subframes to enable the UE to receive the first and second reference signals from both the first and second nodes in the first subframes.

In one design, the first and second reference signals may overlap, and the UE may receive the first and second reference signals on the same time-frequency resources (e.g., on the same CSI-RS pattern) in the first subframes. In another design, the first and second reference signals may not overlap, and the UE may receive the first and second reference signals on different time-frequency resources (e.g., on different CSI-RS patterns) in the first subframes. In yet another design, the first and second reference signals may partially overlap. The UE may receive the first reference signal on first time-frequency resources, receive the second reference signal on second time-frequency resources, and receive both the first and second reference signals on third time-frequency resources in the first subframes In one design, the first reference signal may be transmitted by the first node from a set of antenna ports, and the second reference signal may be transmitted by the second node from the same set of antenna ports. In another design, the first reference signal may be transmitted by the first node from a first set of antenna ports, and the second reference signal may be transmitted by the second node from a second set of antenna ports different from the first set of antenna ports.

In one design of block 918, the UE may report the first CSI, the second CSI, and/or the third CSI based on a reporting schedule for each CSI. Alternatively or additionally, the UE may report each CSI whenever it is requested. In one design, the UE may report RI and CQI in separate reports sent in different subframes. In another design, the UE may report RI and CQI together in a single report.

FIG. 10 shows a design of a process 1000 for supporting communication by a first node. The first node may transmit a first reference signal (e.g., a first CSI-RS) in first subframes (block 1012). A second node may transmit a second reference signal (e.g., a second CSI-RS) in the first subframes and second subframes. The first reference signal may coincide with the second reference signal in the first subframes but not the second subframes. The first node may receive first CSI for the first subframes from a UE (block 1014). The first CSI may be determined by the UE based on the first and second reference signals received in the first subframes by the UE and based further on an indication for the UE to determine CSI separately for the first subframes and the second subframes. The first node may transmit data to the UE based on the first CSI (block 1016).

The first node may also transmit the first reference signal in third subframes, and the first reference signal may not coincide with the second reference signal in the third subframes. The first node may receive second CSI for the third subframes from the UE. The second CSI may be determined by the UE based on the first reference signal received in the third subframes by the UE and based further on an indication for the UE to determine CSI separately for the third subframes In one design, the first node may transmit the first reference signal at a first periodicity, and the second node may transmit the second reference signal at a second periodicity different from the first periodicity, e.g., as shown in FIGS. 6 and 8. In another design, the first node may transmit the first reference signal at a first periodicity in third subframes, and the second node may transmit the second reference signal at the first periodicity in the second subframes, with the second subframes being interlaced with the third subframes, e.g., as shown in FIG. 7. In this design, the first subframes may be extra subframes in which the second node transmits the second reference signal.

In one design, the first node may perform rate matching for data to avoid transmitting the data on the resource elements used to transmit the first reference signal. In one design, the first node may perform puncturing or rate matching for data to avoid transmitting the data on the resource elements used to transmit the second reference signal. The first node may mute (e.g., not transmit data on) the resource elements used to transmit the reference signals.

In one design, the first node may correspond to a relay, and the second node may correspond to a base station. The first node may receive a first transmission of data from the base station, decode the first transmission to recover the data sent by the base station, and send a second transmission of the data from the relay to the UE. The second transmission of the data may be sent by only the relay or by both the relay and the base station to the UE. In one design, the relay may be a transparent relay, and control information may be sent by the base station to the UE and not by the relay to the UE. In another design, the relay may be a non-transparent relay and may send control information to the UE.

In another design, the first and second nodes may correspond to two cells for CoMP transmission to the UE. The first node may perform precoding for a transmission of data based on the first CSI and may send the transmission of data to the UE.

The first node may transmit signals (e.g., for the first reference signal and data transmission) from first antenna ports at the first node to the UE. In one design, the first antenna ports may correspond to physical antennas at the first node. In another design, the first antenna ports may correspond to virtual antennas at the first node. The first node may form the virtual antennas based on the physical antennas at the first node. For example, the first node may form a virtual antenna by combining multiple physical antennas with cyclic delay diversity. The number of virtual antennas may be less than the number of physical antennas at the first node. In this case, the virtual antennas may be formed based on a precoding matrix having a dimension determined by the number of virtual antennas and the number of physical antennas at the first node. The number of virtual antennas may also be greater than the number of physical antennas at the first node. In this case, the virtual antennas may be formed based on precoding vectors that may not be orthogonal to one another, one precoding vector for each virtual antenna.

In one design, the first node may map the first antenna ports of the first node to second antenna ports of the second node. The first antenna ports may correspond to virtual antennas or physical antennas at the first node. The second antenna ports may also correspond to virtual antennas or physical antennas at the second node. The number of antenna ports at the first node may or may not match the number of antenna ports at the second node. In one design, the first node may transmit the first reference signal from the first antenna ports using a first set of resources in the first subframes. The second node may transmit the second reference signal from the second antenna ports using a second set of resources in the first subframe.

Figure 11:
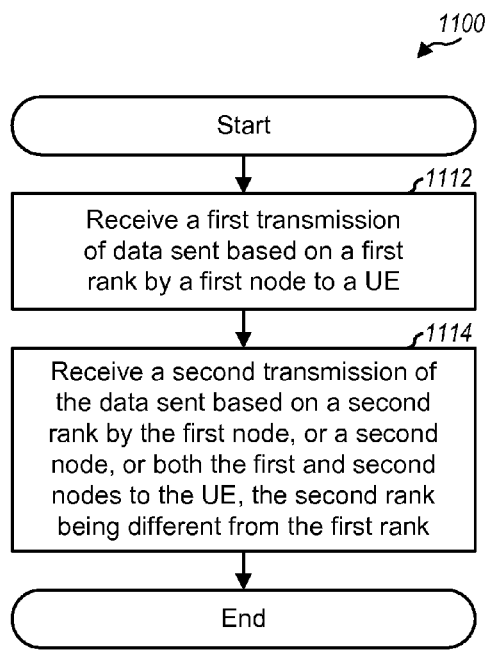
FIG. 11 shows a process for receiving transmissions with different ranks from multiple nodes by a UE.

FIG. 11 shows a design of a process 1100 for communication by a UE. The UE may receive a first transmission of data sent based on a first rank by a first node to the UE (block 1112). The data may comprise one or more transport blocks or packets. The UE may receive a second transmission of the data sent based on a second rank by the first node and/or a second node to the UE, with the second rank being different from (e.g., higher than) the first rank (block 1114). For example, the first rank may be rank 1, and the second rank may be rank 2. The first and second transmissions of the data may be for HARQ. The first transmission of the data may be sent by only the first node. The second transmission of the data may be sent by only the second node or by both the first and second nodes. In another example, the first rank may be rank 2, and the second rank may be rank 1. The first and second transmissions of the data may be for HARQ. The first transmission of the data may be sent by only the first node (e.g., to the second node), and the second transmission of the data may be sent by the second node (e.g., to the UE).

In one design, the UE may receive a first reference signal from the first node and may determine the first rank based on the first reference signal. In one design, the UE may receive a second reference signal from the second node and may determine the second rank based on the second reference signal. In another design, the UE may concurrently receive the first and second reference signals from the first and second nodes and may determine the second rank based on the first and second reference signals.

In one design, the first node may correspond to a base station, and the second node may correspond to a relay. The first rank may be determined based on a backhaul channel between the base station and the relay or a direct channel between the base station and the UE. The second rank may be determined based on an access channel between the relay and the UE or a composite channel comprising the access channel and the direct channel. In another design, the first and second nodes may be two cells or other entities.

Figure 12:
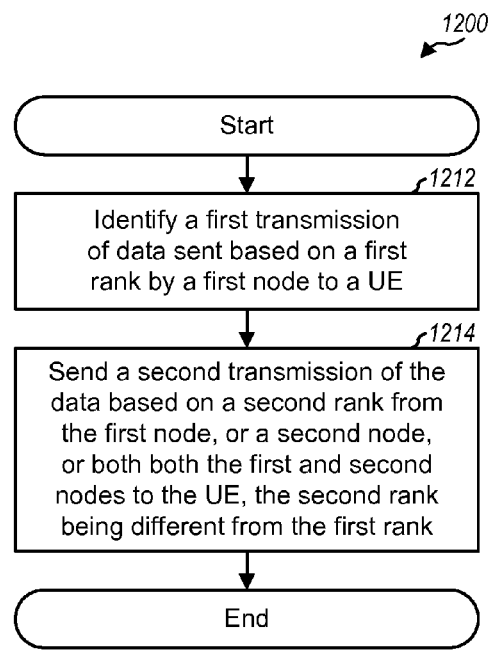
FIG. 12 shows a process for sending transmission by a node to a UE.

FIG. 12 shows a design of a process 1200 for supporting communication. A second node may identify a first transmission of data sent based on a first rank by a first node to a UE (block 1212). The second node may send a second transmission of the data based on a second rank to the UE, with the second rank being different from (e.g., higher than) the first rank (block 1214). In one design, only the second node may send the second transmission to the UE. In another design, the second transmission may also be sent by the first node to the UE. In one design, the second node may receive the first transmission of data, decode the first transmission to recover the data, and generate the second transmission of the data based on the recovered data.

Figure 13:
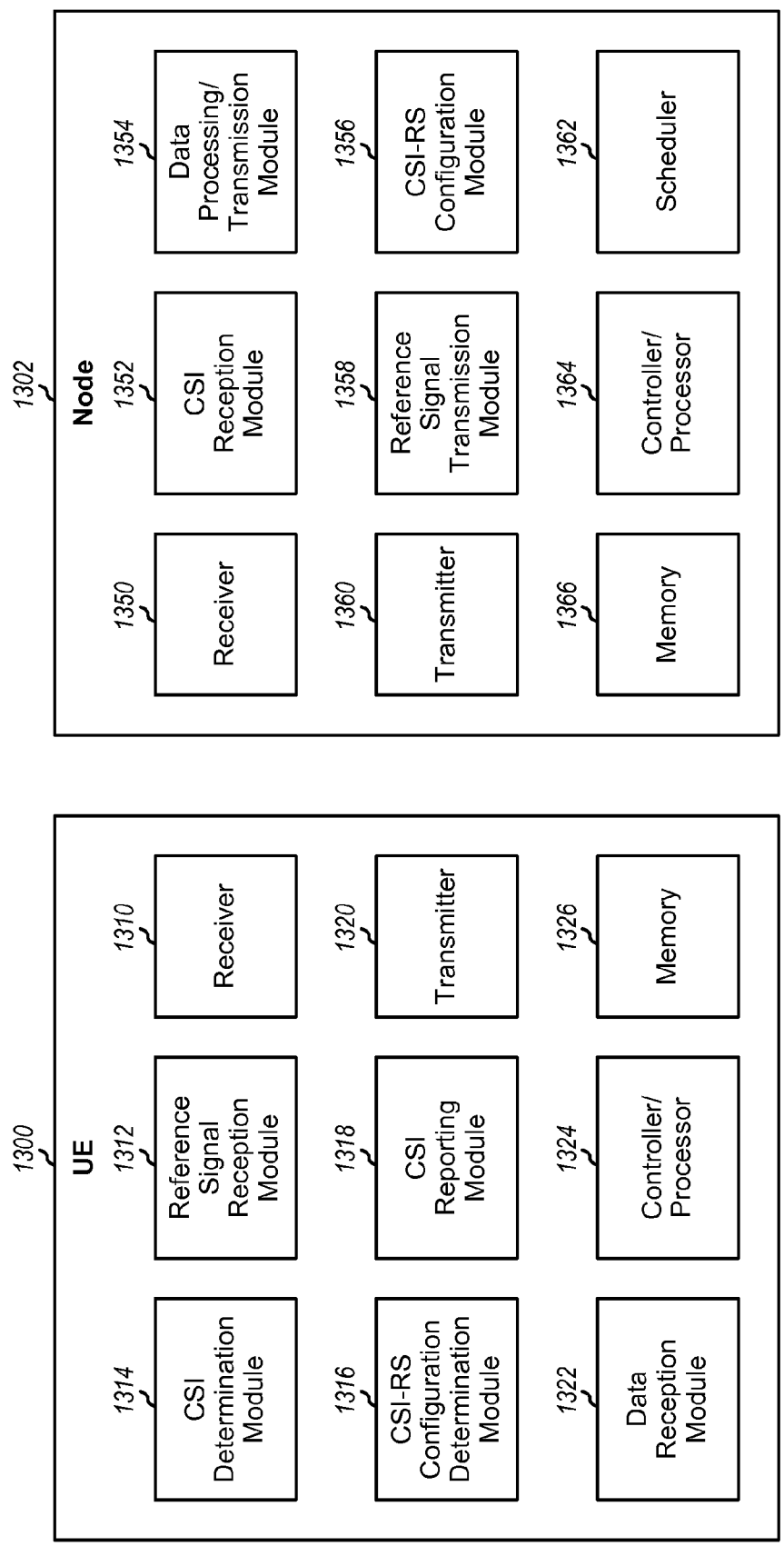
FIG. 13 shows a block diagram of a design of a UE and a node.

FIG. 13 shows a block diagram of a design of a UE 1300 and a node 1302, which may be a base station, a relay, etc. Within UE 1300, a receiver 1310 may receive signals transmitted by nodes, e.g., base stations, relays, cells, etc. A module 1312 may receive reference signals (e.g., CSI-RS) from the nodes and may make measurements (e.g., for channel gains) based on the reference signals. A module 1314 may determine CSI (e.g., RI, CQI, PMI and/or CDI) for nodes of interest based on the measurements. A module 1316 may determine the CSI-RS configurations of different nodes and may identify subframes in which the reference signal from each node is transmitted. A module 1318 may determine CSI for each node and each combination of nodes based on the information from module 1316. Module 1318 may also generate reports for the CSI and may send the reports to one or more designated nodes (e.g., a serving node). A transmitter 1320 may transmit the reports and other information. A module 1322 may receive transmissions of data sent based on the CSI and may process the received transmissions to recover the data. The various modules within UE 1300 may operate as described above. A controller/processor 1324 may direct the operation of various modules within UE 1300. A memory 1326 may store data and program codes for UE 1300.

Within node 1302, a receiver 1350 may receive signals transmitted by UE 1300, other UEs, and possibly other nodes. A module 1352 may receive reports from UE 1300 and extract CSI from the reports. A module 1354 may generate a transmission of data for UE 1300 based on the CSI. Module 1354 may determine the rank, modulation and coding scheme (MCS), and/or other parameters for the transmission of data based on the CSI. Module 1354 may also determine precoding vectors for the transmission of data based on the CSI. Module 1354 may generate the transmission of data based on the various parameters determined from the CSI. A module 1356 may determine the CSI-RS configuration of node 1302 and may signal/convey it to UE 1300. A module 1358 may generate reference signals (e.g., CSI-RS) based on the CSI-RS configuration of node 1302. A transmitter 1360 may transmit the reference signals, data, and/or other information. The various modules within node 1302 may operate as described above. A scheduler 1362 may schedule UEs for data transmission. A controller/processor 1364 may direct the operation of various modules within node 1302. A memory 1366 may store data and program codes for node 1302.

Figure 14:
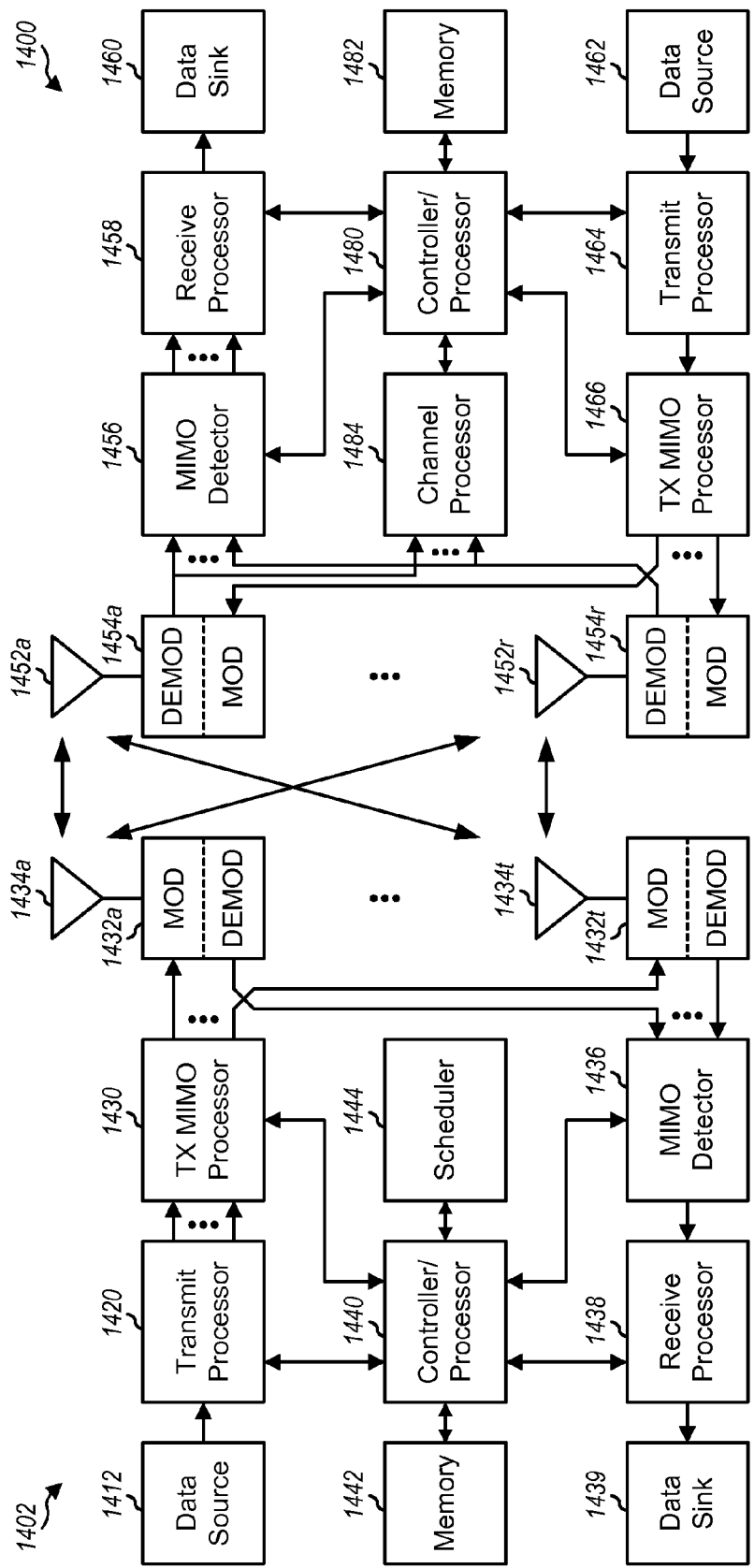
FIG. 14 shows a block diagram of another design of a UE and a node.

FIG. 14 shows a block diagram of a design of a UE 1400 and a node 1402, which may be a base station, a relay, etc. Node 1402 may be equipped with T antennas 1434a through 1434t, and UE 1400 may be equipped with R antennas 1452a through 1452r, where in general T≥1 and R≥1.

At node 1402, a transmit processor 1420 may receive data from a data source 1412 for one or more UEs, process (e.g., encode and modulate) the data for each UE based on one or more modulation and coding schemes selected for that UE, and provide data symbols for all UEs. Transmit processor 1420 may also process control information (e.g., for configuration messages, grants, etc.) and provide control symbols. Processor 1420 may also generate reference symbols for reference signals (e.g., CRS and CSI-RS). A transmit (TX) MIMO processor 1430 may precode the data symbols, the control symbols, and/or the reference symbols (if applicable) and may provide T output symbol streams to T modulators (MOD) 1432a through 1432t. Each modulator 1432 may process its output symbol stream (e.g., for OFDM, etc.) to obtain an output sample stream. Each modulator 1432 may further condition (e.g., convert to analog, amplify, filter, and upconvert) its output sample stream to obtain a modulated signal. T modulated signals from modulators 1432a through 1432t may be transmitted via T antennas 1434a through 1434t, respectively.

At UE 1400, antennas 1452a through 1452r may receive the modulated signals from node 1402 and/or other nodes and may provide received signals to demodulators (DEMODs) 1454a through 1454r, respectively. Each demodulator 1454 may condition (e.g., filter, amplify, downconvert, and digitize) its received signal to obtain input samples. Each demodulator 1454 may further process the input samples (e.g., for OFDM, etc.) to obtain received symbols. A MIMO detector 1456 may obtain received symbols from all R demodulators 1454a through 1454r, perform MIMO detection, and provide detected symbols. A receive processor 1458 may process (e.g., demodulate and decode) the detected symbols, provide decoded data for UE 1400 to a data sink 1460, and provide decoded control information to a controller/processor 1480. A channel processor 1484 may make measurements based on reference signals for each node of interest. Processor 1480 and/or 1484 may determine CSI for each node and each combination of nodes of interest based on the measurements.

At UE 1400, a transmit processor 1464 may receive and process data from a data source 1462 and control information (e.g., CSI) from controller/processor 1480. Processor 1464 may also generate reference symbols for one or more reference signals. The symbols from transmit processor 1464 may be precoded by a TX MIMO processor 1466 if applicable, further processed by modulators 1454a through 1454r (e.g., for SC-FDM, OFDM, etc.), and transmitted. At node 1402, the modulated signals from UE 1400 and other UEs may be received by antennas 1434, processed by demodulators 1432, detected by a MIMO detector 1436 if applicable, and further processed by a receive processor 1438 to obtain decoded data and control information sent by UE 1400 and other UEs. Processor 1438 may provide the decoded data to a data sink 1439 and the decoded control information to controller/processor 1440.

Controllers/processors 1440 and 1480 may direct the operation at node 1402 and UE 1400, respectively. Processor 1480 and/or other processors and modules at UE 1400 may perform or direct process 900 in FIG. 9, process 1100 in FIG. 11, and/or other processes for the techniques described herein. Processor 1440 and/or other processors and modules at node 1402 may perform or direct process 1000 in FIG. 10, process 1200 in FIG. 12, and/or other processes for the techniques described herein. Memories 1442 and 1482 may store data and program codes for node 1402 and UE 1400, respectively. A scheduler 1444 may schedule UEs for data transmission.

In one configuration, apparatus 1300 or 1400 for wireless communication may include means for receiving a first reference signal from a first node in first subframes by a UE, means for receiving a second reference signal from a second node in the first subframes and second subframes by the UE, with the second reference signal coinciding with the first reference signal in the first subframes but not the second subframes, means for receiving an indication to determine CSI separately for the first subframes and the second subframes, means for determining first CSI for the first subframes by the UE based on the first and second reference signals received in the first subframes by the UE, and means for determining second CSI for the second subframes by the UE based on the second reference signal received in the second subframes by the UE.

In another configuration, apparatus 1302 or 1402 for wireless communication may include means for transmitting a first reference signal in first subframes by a first node, wherein a second reference signal is transmitted by a second node in the first subframes and second subframes, and wherein the first reference signal coincides with the second reference signal in the first subframes but not the second subframes, and means for receiving first CSI for the first subframes from a UE, the first CSI being determined by the UE based on the first and second reference signals received in the first subframes by the UE and based further on an indication for the UE to determine CSI separately for the first subframes and the second subframes.

In yet another configuration, apparatus 1300 or 1400 for wireless communication may include means for receiving a first transmission of data sent based on a first rank by a first node to a UE, and means for receiving a second transmission of the data sent based on a second rank by the first node and/or a second node to the UE, with the second rank being different from the first rank.

In yet another configuration, apparatus 1302 or 1402 for wireless communication may include means for identifying a first transmission of data sent based on a first rank by a first node to a UE, and means for sending a second transmission of the data based on a second rank from the first node and/or a second node to the UE, with the second rank being different from the first rank.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or any combination thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    receiving a first reference signal from a first node in first subframes by a user equipment (UE);
    receiving a second reference signal from a second node in the first subframes and second subframes by the UE, the second reference signal coinciding with the first reference signal in the first subframes but not the second subframes;
    receiving an indication to determine channel state information (CSI) separately for the first subframes and the second subframes;
    determining first CSI for the first subframes by the UE based on the first and second reference signals received in the first subframes by the UE; and
    determining second CSI for the second subframes by the UE based on the second reference signal received in the second subframes by the UE.

2. The method of claim 1, wherein the first node corresponds to a relay and the second node corresponds to a base station.

3. The method of claim 1, wherein the first and second nodes correspond to two cells supporting coordinated multi-point (CoMP) transmission to the UE.

4. The method of claim 1, wherein the receiving the first reference signal comprises receiving the first reference signal from the first node at a first periodicity, and wherein the receiving the second reference signal comprises receiving the second reference signal from the second node at a second periodicity different from the first periodicity.

5. The method of claim 4, wherein the first and second reference signals are both received at a third periodicity.

6. The method of claim 1, wherein the receiving the first reference signal comprises receiving the first reference signal from the first node at a first periodicity in third subframes, and wherein the receiving the second reference signal comprises receiving the second reference signal from the second node at the first periodicity in the second subframes, the second subframes being interlaced with the third subframes.

7. The method of claim 6, wherein the first subframes correspond to a subset of the third subframes to enable the UE to receive the first and second reference signals from both the first and second nodes in the first subframes.

8. The method of claim 1, wherein the first and second reference signals are received on same time-frequency resources in the first subframes.

9. The method of claim 1, wherein the first and second reference signals are received on different time-frequency resources in the first subframes.

10. The method of claim 1, wherein the first reference signal is received on first time-frequency resources, the second reference signal is received on second time-frequency resources, and both the first and second reference signals are received on third time-frequency resources in the first subframes.

11. The method of claim 1, wherein the receiving the first reference signal comprises receiving the first reference signal transmitted by the first node from a first set of antenna ports, and wherein the receiving the second reference signal comprises receiving the second reference signal transmitted by the second node from a second set of antenna ports different from the first set of antenna ports.

12. The method of claim 1, further comprising:
    receiving the first reference signal from the first node in third subframes, the first reference signal not coinciding with the second reference signal in the third subframes; and
    determining third CSI for the third subframes by the UE based on the first reference signal received in the third subframes by the UE.

13. The method of claim 1, wherein at least one of the first CSI or the second CSI comprises rank indicator (RI), channel quality indicator (CQI), precoding matrix indicator (PMI), channel direction indicator (CDI), or a combination thereof.

14. The method of claim 1, further comprising:
    reporting the first CSI and the second CSI by the UE; and
    receiving data transmission sent by only the first node, or only the second node, or both the first and second nodes based on the first CSI, or the second CSI, or both.

15. An apparatus for wireless communication, comprising:
    at least one processor configured to receive a first reference signal from a first node in first subframes by a user equipment (UE), to receive a second reference signal from a second node in the first subframes and second subframes by the UE, the second reference signal coinciding with the first reference signal in the first subframes but not the second subframes, to receive an indication to determine channel state information (CSI) separately for the first subframes and the second subframes, to determine first CSI for the first subframes based on the first and second reference signals received in the first subframes, and to determine second CSI for the second subframes based on the second reference signal received in the second subframes.

16. The apparatus of claim 15, wherein the at least one processor is configured to receive the first reference signal from the first node at a first periodicity, and to receive the second reference signal from the second node at a second periodicity different from the first periodicity.

17. The apparatus of claim 15, wherein the at least one processor is configured to receive the first reference signal from the first node at a first periodicity in third subframes, and to receive the second reference signal from the second node at the first periodicity in the second subframes, the second subframes being interlaced with the third subframes.

18. The apparatus of claim 15, wherein the at least one processor is configured to receive the first reference signal transmitted by the first node from a first set of antenna ports, and to receive the second reference signal transmitted by the second node from a second set of antenna ports different from the first set of antenna ports.

19. The apparatus of claim 15, wherein the at least one processor is configured to receive the first reference signal from the first node in third subframes, the first reference signal not coinciding with the second reference signal in the third subframes, and to determine third CSI for the third subframes based on the first reference signal received in the third subframes.

20. An apparatus for wireless communication, comprising:
means for receiving a first reference signal from a first node in first subframes by a user equipment (UE);
means for receiving a second reference signal from a second node in the first subframes and second subframes by the UE, the second reference signal coinciding with the first reference signal in the first subframes but not the second subframes;
means for receiving an indication to determine channel state information (CSI) separately for the first subframes and the second subframes;
means for determining first CSI for the first subframes based on the first and second reference signals received in the first subframes; and
means for determining second CSI for the second subframes based on the second reference signal received in the second subframes.

21. The apparatus of claim 20, wherein the means for receiving the first reference signal comprises means for receiving the first reference signal from the first node at a first periodicity, and wherein the means for receiving the second reference signal comprises means for receiving the second reference signal from the second node at a second periodicity different from the first periodicity.

22. The apparatus of claim 20, wherein the means for receiving the first reference signal comprises means for receiving the first reference signal from the first node at a first periodicity in third subframes, and wherein the means for receiving the second reference signal comprises means for receiving the second reference signal from the second node at the first periodicity in the second subframes, the second subframes being interlaced with the third subframes.

23. The apparatus of claim 20, wherein the means for receiving the first reference signal comprises means for receiving the first reference signal transmitted by the first node from a first set of antenna ports, and wherein the means for receiving the second reference signal comprises means for receiving the second reference signal transmitted by the second node from a second set of antenna ports different from the first set of antenna ports.

24. The apparatus of claim 20, further comprising:
means for receiving the first reference signal from the first node in third subframes, the first reference signal not coinciding with the second reference signal in the third subframes; and
means for determining third CSI for the third subframes based on the first reference signal received in the third subframes.

25. A computer program product, comprising:
a non-transitory computer-readable medium comprising:
code for causing at least one processor to receive a first reference signal from a first node in first subframes by a user equipment (UE),
code for causing the at least one processor to receive a second reference signal from a second node in the first subframes and second subframes by the UE, the second reference signal coinciding with the first reference signal in the first subframes but not the second subframes,
code for causing the at least one processor to receive an indication to determine channel state information (CSI) separately for the first subframes and the second subframes,
code for causing the at least one processor to determine first CSI for the first subframes based on the first and second reference signals received in the first subframes, and
code for causing the at least one processor to determine second CSI for the second subframes based on the second reference signal received in the second subframes.

26. A method for wireless communication, comprising:
transmitting a first reference signal in first subframes by a first node, wherein a second reference signal is transmitted by a second node in the first subframes and second subframes, and wherein the first reference signal coincides with the second reference signal in the first subframes but not the second subframes; and
receiving first channel state information (CSI) for the first subframes from a user equipment (UE), the first CSI being determined by the UE based on the first and second reference signals received in the first subframes by the UE and based further on an indication for the UE to determine CSI separately for the first subframes and the second subframes.

27. The method of claim 26, further comprising:
transmitting the first reference signal in third subframes by the first node, the first reference signal not coinciding with the second reference signal in the third subframes; and
receiving second CSI for the third subframes from the UE, the second CSI being determined by the UE based on the first reference signal received in the third subframes by the UE and based further on an indication for the UE to determine CSI separately for the third subframes.

28. The method of claim 26, further comprising:
  transmitting data from the first node to the UE based on the first CSI.

29. The method of claim 26, wherein the first reference signal is transmitted by the first node at a first periodicity, and wherein the second reference signal is transmitted by the second node at a second periodicity different from the first periodicity.

30. The method of claim 26, wherein the first reference signal is transmitted by the first node at a first periodicity in third subframes, and wherein the second reference signal is transmitted by the second node at the first periodicity in the second subframes, the second subframes being interlaced with the third subframes.

31. The method of claim 26, wherein the first node corresponds to a relay and the second node corresponds to a base station.

32. The method of claim 31, further comprising:
  receiving a first transmission of data from the base station at the relay;
  decoding the first transmission to recover the data sent by the base station; and
  sending a second transmission of the data from the relay to the UE.

33. The method of claim 26, wherein the first and second nodes correspond to two cells for coordinated multi-point (CoMP) transmission to the UE.

34. The method of claim 33, further comprising:
  performing precoding for a transmission of data based on the CSI; and
  sending the transmission of data from the first node to the UE.

35. The method of claim 26, further comprising:
  mapping first antenna ports of the first node to second antenna ports of the second node; and
  transmitting the first reference signal from the first antenna ports of the first node to the UE.

36. The method of claim 35, further comprising:
  forming a plurality of virtual antennas based on a plurality of physical antennas at the first node, wherein the first antenna ports of the first node correspond to the plurality of virtual antennas.

37. The method of claim 26, further comprising:
  transmitting the first reference signal from first antenna ports using a first set of resources in the first subframes by the first node, wherein the second reference signal is transmitted from second antenna ports using a second set of resources in the first subframes by the second node.

38. An apparatus for wireless communication, comprising:
  at least one processor configured to send a first reference signal in first subframes by a first node, wherein a second reference signal is transmitted by a second node in the first subframes and second subframes, and wherein the first reference signal coincides with the second reference signal in the first subframes but not the second subframes, and to receive first channel state information (CSI) for the first subframes from a user equipment (UE), the first CSI being determined by the UE based on the first and second reference signals received in the first subframes by the UE and based further on an indication for the UE to determine CSI separately for the first subframes and the second subframes.

39. The apparatus of claim 38, wherein the at least one processor is configured to transmit the first reference signal in third subframes by the first node, the first reference signal not coinciding with the second reference signal in the third subframes, and to receive second CSI for the third subframes from the UE, the second CSI being determined by the UE based on the first reference signal received in the third subframes by the UE and based further on an indication for the UE to determine CSI separately for the third subframes.

40. The apparatus of claim 38, wherein the first node corresponds to a relay and the second node corresponds to a base station, and wherein the at least one processor is configured to receive a first transmission of data from the base station at the relay, to decode the first transmission to recover the data sent by the base station, and to send a second transmission of the data from the relay to the UE.

41. The apparatus of claim 38, wherein the first and second nodes correspond to two cells for coordinated multi-point (CoMP) transmission to the UE, and wherein the at least one processor is configured to perform precoding for a transmission of data based on the CSI, and to send the transmission of data from the first node to the UE.

* * * * *